(12) United States Patent
Okada et al.

(10) Patent No.: US 6,810,463 B2
(45) Date of Patent: Oct. 26, 2004

(54) GAMING MACHINE THAT IS USABLE WITH DIFFERENT GAME CARTRIDGE TYPES

(75) Inventors: Satoru Okada, Kyoto (JP); Kazuo Yoneyama, Kyoto (JP); Masahiko Ota, Kyoto (JP); Ryuji Umezu, Kyoto (JP); Takanobu Nakashima, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 297 days.

(21) Appl. No.: 09/863,866

(22) Filed: May 23, 2001

(65) Prior Publication Data

US 2001/0047452 A1 Nov. 29, 2001

Related U.S. Application Data

(63) Continuation-in-part of application No. 09/627,440, filed on Jul. 28, 2000.

(30) Foreign Application Priority Data

| May 24, 2000 | (JP) | .............. 2000-153706 |
| May 24, 2000 | (JP) | .............. 2000-153707 |
| May 24, 2000 | (JP) | .............. 2000-153708 |
| Jan. 25, 2001 | (JP) | .............. 2001-016866 |

(51) Int. Cl.⁷ ............................................. G06F 12/00
(52) U.S. Cl. .................. 711/115; 711/4; 711/104; 711/105; 711/170
(58) Field of Search ................ 711/5, 104–105, 711/115, 170; 463/43–45

(56) References Cited

U.S. PATENT DOCUMENTS 4,204,728 A    5/1980 Goshima et al.
4,481,529 A   11/1984 Kerling .................. 358/30
4,516,777 A    5/1985 Nikora .................. 273/148
4,542,903 A    9/1985 Yokoi et al. ............ 273/85

(List continued on next page.)

FOREIGN PATENT DOCUMENTS

| EP | 0 960 637 | 12/1999 | | |
| JP | 63-242293 | 10/1988 | | |
| JP | 4-49989 | 2/1992 | | |
| JP | 4-140791 | 5/1992 | | |
| JP | 4-140792 | 5/1992 | | |
| JP | 5-204820 | 8/1993 | | |
| JP | 6-42263 | 6/1994 | | |
| JP | 7-204349 | 8/1995 | | |
| JP | 8-180149 | 7/1996 | | |
| JP | 08180149 AA | * 7/1996 | .......... | G06K/17/00 |
| JP | 10-137447 | 5/1998 | | |
| JP | 10-222621 | 8/1998 | | |
| JP | 10-328408 | 12/1998 | | |
| JP | 11-207034 | 8/1999 | | |
| JP | 11-333144 | 12/1999 | | |

OTHER PUBLICATIONS

Application No. 09/627,440.

(List continued on next page.)

*Primary Examiner*—T Nguyen
(74) *Attorney, Agent, or Firm*—Nixon & Vanderhye, PC

(57) ABSTRACT

An information processing device such as a game machine is selectively connectable to different peripheral devices such as memory devices. These peripheral devices may be provided with characteristics for distinguishing one from another. The information processing device carries out operations based on the peripheral device connected thereto.

42 Claims, 22 Drawing Sheets

U.S. PATENT DOCUMENTS

| | | | |
|---|---|---|---|
| 4,628,304 A | 12/1986 | Bottiau | 340/703 |
| 4,703,318 A | 10/1987 | Haggerty | |
| 4,865,321 A * | 9/1989 | Nakagawa et al. | 463/29 |
| 4,922,420 A | 5/1990 | Nakagawa et al. | 364/410 |
| 4,924,413 A | 5/1990 | Suwannukul | 364/521 |
| 4,931,860 A | 6/1990 | Narumiya | 358/75 |
| 4,977,398 A | 12/1990 | Pleva et al. | |
| 4,979,738 A | 12/1990 | Frederiksen | 273/1 |
| 4,981,296 A | 1/1991 | Shiraishi et al. | |
| 4,984,193 A * | 1/1991 | Nakagawa | 711/115 |
| 5,023,603 A | 6/1991 | Wakimoto et al. | |
| 5,095,798 A | 3/1992 | Okada et al. | 84/609 |
| 5,109,504 A | 4/1992 | Littleton | |
| 5,134,391 A | 7/1992 | Okada | 340/799 |
| 5,155,380 A | 10/1992 | Hwang et al. | |
| 5,161,803 A | 11/1992 | Ohara | 273/435 |
| 5,184,830 A | 2/1993 | Okada et al. | 273/433 |
| 5,207,426 A | 5/1993 | Inoue et al. | 273/148 |
| 5,238,250 A | 8/1993 | Leung et al. | |
| 5,245,327 A | 9/1993 | Pleva et al. | |
| 5,265,888 A | 11/1993 | Yamamoto et al. | 273/434 |
| 5,300,944 A | 4/1994 | Shapiro et al. | 345/88 |
| 5,327,158 A | 7/1994 | Takahashi et al. | |
| 5,371,512 A | 12/1994 | Otake et al. | |
| 5,395,112 A | 3/1995 | Darling | 273/148 |
| 5,400,053 A | 3/1995 | Johary et al. | 345/147 |
| 5,412,800 A | 5/1995 | Bril et al. | 395/500 |
| 5,422,375 A | 6/1995 | Rytter et al. | 345/147 |
| 5,453,763 A | 9/1995 | Nakagawa et al. | |
| 5,495,266 A | 2/1996 | Otake et al. | |
| 5,509,663 A | 4/1996 | Otake et al. | |
| 5,552,799 A | 9/1996 | Hashiguchi | 345/3 |
| 5,556,108 A | 9/1996 | Nagano et al. | 463/45 |
| 5,559,954 A | 9/1996 | Sakoda et al. | 395/164 |
| 5,592,651 A * | 1/1997 | Rackman | 711/163 |
| 5,603,064 A * | 2/1997 | Bennett | 370/471 |
| 5,608,424 A | 3/1997 | Takahashi et al. | |
| 5,617,546 A * | 4/1997 | Shih et al. | 710/307 |
| RE35,520 E | 5/1997 | Darling et al. | 463/45 |
| 5,659,673 A | 8/1997 | Nonoshita | |
| 5,708,457 A | 1/1998 | Otake et al. | |
| 5,759,104 A | 6/1998 | Shirae et al. | 463/45 |
| 5,768,608 A * | 6/1998 | Nakamura | 712/32 |
| 5,770,533 A | 6/1998 | Franchi | |
| 5,785,598 A | 7/1998 | Hsu | 463/44 |
| 5,790,096 A | 8/1998 | Hill, Jr. | 345/150 |
| 5,793,351 A | 8/1998 | Leach | 345/150 |
| 5,808,591 A | 9/1998 | Mantani | |
| 5,844,532 A | 12/1998 | Silverbrook et al. | 345/89 |
| 5,854,620 A | 12/1998 | Mills et al. | 345/153 |
| 5,892,939 A | 4/1999 | Call et al. | 395/500 |
| 5,954,808 A | 9/1999 | Paul | 710/104 |
| 5,959,596 A | 9/1999 | McCarten et al. | 345/2 |
| 6,020,751 A | 2/2000 | Rampone et al. | 324/765 |
| 6,042,478 A | 3/2000 | Ng | |
| 6,047,373 A | 4/2000 | Hall et al. | 713/1 |
| 6,052,794 A | 4/2000 | Polzin et al. | 713/500 |
| 6,115,054 A | 9/2000 | Giles | 345/522 |
| 6,132,315 A | 10/2000 | Miyamoto et al. | 463/43 |
| 6,200,216 B1 | 3/2001 | Peppel | |
| 6,209,043 B1 | 3/2001 | Sanemitsu | |
| 6,311,246 B1 | 10/2001 | Wegner et al. | 710/126 |
| 6,315,669 B1 | 11/2001 | Okada et al. | |
| 6,322,447 B1 | 11/2001 | Okada et al. | |
| 6,334,815 B2 * | 1/2002 | Miyamoto et al. | 463/43 |
| 6,480,929 B1 * | 11/2002 | Gauthier et al. | 711/105 |
| 2001/0047452 A1 | 11/2001 | Okada | 711/115 |

OTHER PUBLICATIONS

Office Action dated Sep. 18, 2003 in Application No. 09/627,440.

"CardBus—The 32–bit PC Card Option"; The Worldwide Organization for Modular Peripherals; pp. 1–3; PCMCIA 1995.

Computer Closet Collection, NEC Turbo Express, printed from wysiwyg://22/http://www.geocities.com/~compcloset/NECTurboExpress.htm on Sep. 28, 2000 (2 pages), copyright 1997–1999, last modified Jun. 24, 1999.

NEC Turbo Express, printed from http://www.edu.uni-k-lu.ac.at/~kseiner/express.html on Sep. 28, 2000 (2 pages), document date unknown.

Turbo Express FAQ, printed from http://www.gameconsoles.com/turboexp_faq.htm on Sep. 28, 2000 (18 pages), last revision of document: May 25, 1995.

Computer Closet Collection, Sega Game Gear, printed from wysiwyg://28/http://www.geocities.com/~compcloset/SegaGameGear.htm on Sep. 28, 2000 (2 pages), copyright 1997–1999, last modified Jun. 22, 1999.

The Real Game Gear FAQ, Version GG.04, Dec.1999, printed from http://www.classicgaming.com/museum/realggfag.txt on Sep. 28, 2000 (32 pages).

Computer Closet Collection, Atari Lynx, printed from wysiwyg://12/http://www.geocities.com/~compcloset/AtariLynx.htm on Sep. 28, 2000 (2 pages), copyright 1997–1999, last modified Jun. 22, 1999.

[FAQ] Atari Lynx Frequently–Asked Questions, printed from http://www.landfield.com/faqs/games/video–games/atari/lynx on Sep. 28, 2000 (16 pages), last revision of document: May 1, 2000.

Computer Closet Collection, Nintendo Game Boy/Game Boy Light, printed from wysiwyg://40/http://www.geocities.com/~compcloset/NintendoGameBoy.htm on Sep. 28, 2000 (5 pages), copyright 1997–1999, last modified Jun. 22, 1999.

Computer Closet Collection, Milton–Bradley Microvision, printed from wysiwyg://52/http://www.geocities.com/~compcloset/MiltonBradley–Microvision.htm on Sep. 28, 2000 (2 pages), copyright 1997–1999, last modified Jun. 22, 1999.

Microvision FAQ Version 0.08, copyright 1994, 1995, printed from http://www.gameconsoles.com/microvision_faq.htm on Sep. 28, 2000 (13 pages).

Computer Closet Collection, Sega Nomad, printed from wysiwyg://34/http://www.geocities.com/~compcloset/Sega-Nomad.htm on Sep. 28, 2000 (2 pages), copyright 1997–1999, last modified Jun. 22, 1999.

Sega Nomad Press Announcement of Aug. 22, 1995, printed from http://gamezero.com/team–0whats_new/past/nomad.html on Sep. 28, 2000 (2 pages).

Computer Closet Collection, Tiger Game.com, printed from wysiwyg://46/http://www.geocities.com/~compcloset/TigerGameCom.htm on Sep. 28, 2000 (1 page), copyright 1997–1999, last modified Jun. 22, 1999.

Tiger Game.Com, "Low Cost, Big Games", printed from http://gamecenter.com/Consoles/Features/Pocket/ss02.html on Sep. 28, 2000 (2 pages), document date unknown.

* cited by examiner

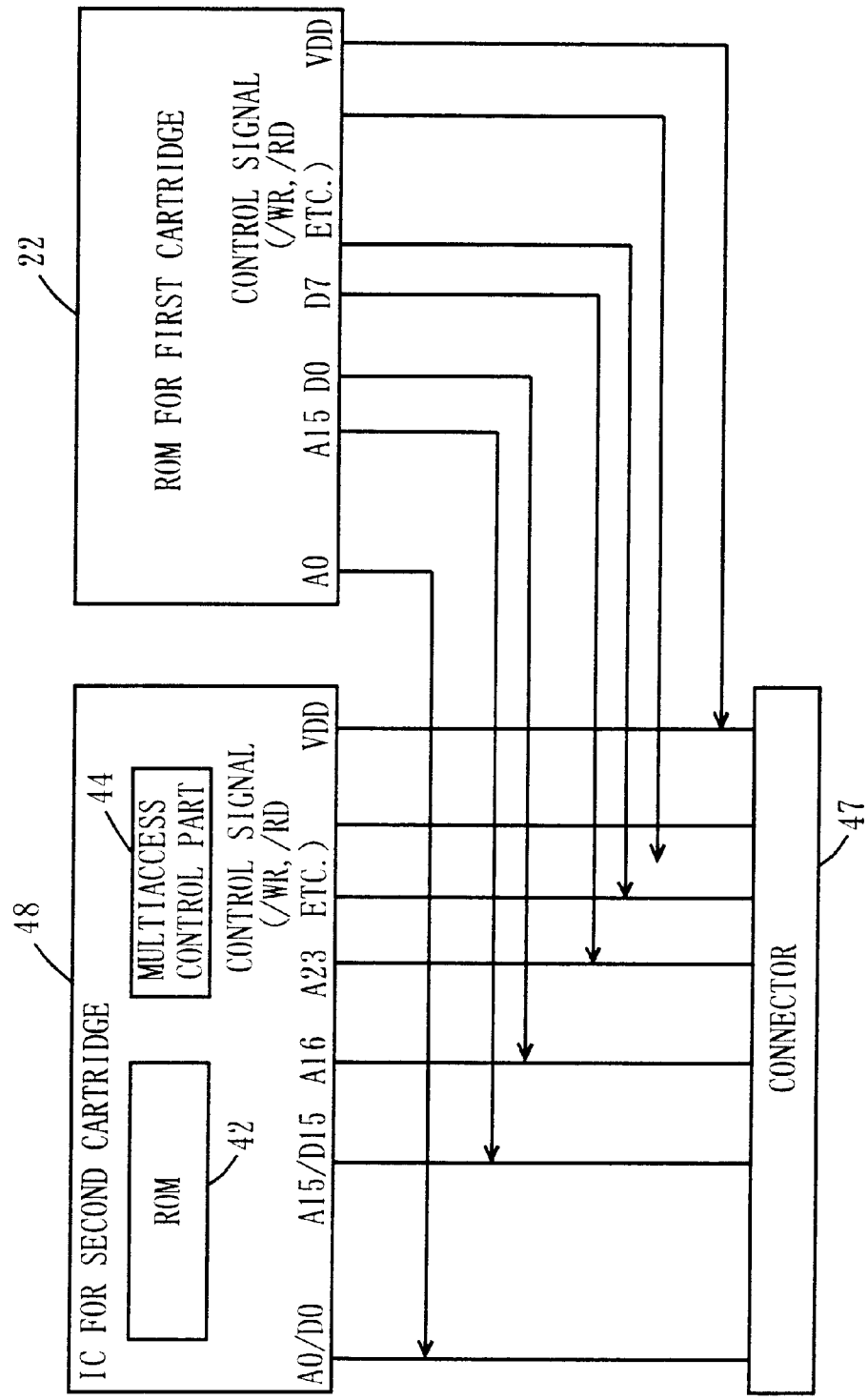

FIG. 12

CARTRIDGE INTERFACE

| NO | ROM22 | ROM42 | RAM43 | REMARKS |
|---|---|---|---|---|
| 1 | VDD(5V) | VDD(3.3V) | VDD(3.3V) | VOLTAGE SWITCHING BY DETECTION SWITCH |
| 2 | PHI | PHI | PHI | |
| 3 | /WR | /WR | /WR | |
| 4 | /RD | /RD | /RD | |
| 5 | /CS | /CS | /CS | ROM CHIP SELECT |
| 6 | A0 | A0/D0 | A0 | ADDRESS/DATA COMMON TERMINAL |
| 7 | A1 | A1/D1 | A1 | SAME AS ABOVE |
| 8 | A2 | A2/D2 | A2 | SAME AS ABOVE |
| 9 | A3 | A3/D3 | A3 | SAME AS ABOVE |
| 10 | A4 | A4/D4 | A4 | SAME AS ABOVE |
| 11 | A5 | A5/D5 | A5 | SAME AS ABOVE |
| 12 | A6 | A6/D6 | A6 | SAME AS ABOVE |
| 13 | A7 | A7/D7 | A7 | SAME AS ABOVE |
| 14 | A8 | A8/D8 | A8 | SAME AS ABOVE |
| 15 | A9 | A9/D9 | A9 | SAME AS ABOVE |
| 16 | A10 | A10/D10 | A10 | SAME AS ABOVE |
| 17 | A11 | A11/D11 | A11 | SAME AS ABOVE |
| 18 | A12 | A12/D12 | A12 | SAME AS ABOVE |
| 19 | A13 | A13/D13 | A13 | SAME AS ABOVE |
| 20 | A14 | A14/D14 | A14 | SAME AS ABOVE |
| 21 | A15 | A15/D15 | A15 | SAME AS ABOVE |
| 22 | D0 | A16 | D0 | |
| 23 | D1 | A17 | D1 | |
| 24 | D2 | A18 | D2 | |
| 25 | D3 | A19 | D3 | |
| 26 | D4 | A20 | D4 | |
| 27 | D5 | A21 | D5 | |
| 28 | D6 | A22 | D6 | |
| 29 | D7 | A23 | D7 | |
| 30 | /RES | /CS2 | /CS2 | EACH DIFFERENT ACTION FOR AGB MODE AND CGB MODE |
| 31 | NOT AVAILABLE (VIN) | IREQ/DREQ | IREQ/DREQ | IN CGB MODE, IGNORE VIN INPUT |
| 32 | GND | GND | GND | |

GAMING MACHINE THAT IS USABLE WITH DIFFERENT GAME CARTRIDGE TYPES

This application is a continuation-in-part of application Ser. No. 09/627,440, filed on Jul. 28, 2000, the contents of which are incorporated herein by reference.

BACKGROUND OF THE INVENTION

1. Field of the Invention

The present invention relates to an information processing device having engaged with, in a detachable manner, any one cartridge among a plurality of those each including memory varied in type, and central processing means therein operates in a mode corresponding to the engaged cartridge.

Further, the present invention relates to a storage device corresponding to the cartridge, in a multiplex bus transfer mode, engaged to such information processing device.

Still further, more specifically, the present invention relates to a game system ensuring compatibility among game software, and a game cartridge used for such game system. Compatibility can be successfully ensured by making the game cartridge applicable to both a first game machine of a conventional type and a second game machine higher in performance compared with the first. Such game machine is exemplified by a portable game machine engageable, in a detachable manner, with the game cartridge having a game program stored therein.

2. Description of the Background Art

With reference to FIGS. 21, 22 and 23, described is a conventional information processing system by taking a game system as an example. First, as shown in FIG. 21, a conventional information processing system CGB is mainly composed of a program source 100 and a game machine 200. The program source 100 stores information such as program necessary for the game machine 200 to display images and execute a game, and is structured to be engageable to the game machine 200 in a detachable manner.

The program source 100 is preferably in a form of cartridge including ROM 101, and as required, RAM 102, a clock 104, and a memory bank controller 105. The ROM 101 is exemplarily implemented by nonvolatile memory typified by read-only memory, flash memory, or EE-PROM, and fixedly stores a game program.

The ROM 101 also stores DOT data of an image representing a game character, for example, and as required, a program for data exchange among other game machines (not shown) and a program for ensuring compatibility with any program stored in other program sources (not shown) in the conventional image-display game devices. Hereinafter, the program source 100 is referred to as cartridge. FIG. 23 shows an outer appearance of the cartridge 100.

The RAM 102 is implemented by writable/readable memory typified by random-access memory, and has a region for storing temporary data relevant to the course of the game.

When a memory chunk of the ROM 101 is too large for a CPU in the game machine 200, the memory bank controller 105 divides the memory chunk into a plurality of memory banks, and provides those to the ROM 101 as an upper address based on bank data provided from the CPU. Also to the RAM 102, the memory bank controller 15 accesses in a similar manner. The ROM 101, RAM 102, and memory bank controller 105 are detachably connected to the game machine 200 via a connector 103.

The game machine 200 is mainly composed of an operation key part 202, a Central Processing Unit (CPU) 203, a connector 204, RAM 205, a display controller 206, a liquid crystal display 207, an interface 208, and a connector 209. To the CPU 203, the RAM 205 being working memory for temporarily storing data for game processing, and the display controller 206 are connected. To the display controller 206, the liquid crystal display (LCD) 207 is connected. The CPU 203 is also connected with the connector 209 via the interface 208. The connector 209 is connected to another connector 209 provided to other game machine 200 via a cable for game data exchange with an owner (player) thereof. Here, the CPU 203 is connected to the cartridge 100 via the connector 204.

FIG. 22 shows the outer structure of the information processing system CGB. In the information processing system CGB, the connector 204 (FIG. 21) provided at the rear of the game machine 200 is engaged with the connector 103 (FIG. 21) of the cartridge 100 where memory is located. The operation key part 202 is located on the lower part of the surface (plane) of a housing 201 of the game machine 200. And on the upper part thereof, the liquid crystal display 207 is placed. In the housing 201, a circuit board having the circuit components as shown in FIG. 21 mounted thereon is accommodated.

The operation key 202 includes a direction switch 202a used to move a cursor or direct any character available for the player in desirable directions, an action switch 202b used for action command for the character, a start switch 202c, and a selection switch 202d.

In such information processing system CGB, the CPU 203 is an 8-bit CPU. Accordingly, the ROM 101, RAM 102, memory bank controller 105, and connector 103 are also structured in a data width of 8-bit specifications. Further, in the information processing system CGB in 8-bit specifications, the ROM 101 and RAM 102 are both driven by 5V. The data width herein means a signal width for all of a data signal, address signal, and control signal exchanged between central processing means such as CPU and memory.

Even in such structured information processing system CGB, the CPU needs to be higher in performance to answer back technology innovation in components typified by the CPU, for example, and users' increasing demand for higher processing capability. As a result of such technology innovation, the current CPU is differed in processing bit from that in the information processing system CGB. As one example, the CPU currently carries out processing in 32-bit, and accordingly memory system is required to be the one in 32-bit specifications. Under such circumstances, the connectors 103 and 204 are preferably also in 32-bit specifications. Further, as the CPU becomes in higher in performance, a memory space available therefor needs to be increased (also increasing the number of bits of an address signal) in addition to increasing the number of processing bits. For example, the number of bits of an address signal in the CPU 203 of the conventional information processing system CGB is 16, while that in the CPU in the new information processing system is 24 in some cases. In such case, a memory system needs to correspond thereto, and so does a connector, preferably.

Further, with the advancing semiconductor technology, the information processing system of a newly-released type using a cartridge is generally equipped with an integrated circuit (IC) lower in power consumption. As a result, in the new information processing device, semiconductor memory such as ROM and RAM incorporated in the CPU and the cartridge may be driven by different voltage from that for the conventional. For example, the memory system in the information processing system CGB is driven by 5V, while the new-type information processing system is set to be driven by 3.3 V. Therefore, if a cartridge specifically developed for the information processing device low in driving voltage is used in the conventional higher in driving voltage, semiconductor memory in the cartridge suffers due to too much voltage applied thereto, resulting in memory corruption.

However, the conventional information processing system CGB has been used by a lot of users over many years, and various programs have been developed and supplied to the cartridges 100. The issue here is, as described in the foregoing, in accordance with the new-type CPU higher in performance, the new-type information processing device shall adopt the bus transfer mode between the CPU and the memory, the connector in 32-bit specifications, and the memory system driven by 3.3V. Therefore, this new-type information processing device cannot utilize such programs supplied to the cartridges 100 which are huge software resources so far developed for the conventional information processing system CGB.

To get around this type of problem, such technique as disclosed in Japanese Patent Laid-Open Publication No. 11-333144 (99-333144) is well known to keep cartridges compatible with one another. With this technology, a monochrome-version cartridge developed for an information processing device with a monochrome display becomes applicable to another with a color display. As a precondition to realize such application, CPUs in those two information processing devices need to be equal in number of processing bits and the number of bits of an address signal. Another precondition is that those two information processing devices need to be equal in number of connection terminals for connection with the cartridge, and of bit specifications and the number of bits of an address signal in each CPU.

However, if the CPUs in the high- and low-end machines vary in bit specifications and/or number of bits of an address signal, the above technique is not a solution to keep game cartridges compatible with one another.

Recently, in a fixed-type video game machine with a disk drive for optical recording media such as CD-ROM and DVD, for example, even if the recording media differ in type, compatibility has been successfully retained thereamong.

However, even in such video game machine successfully retained compatibility as such, program data has to be first read from the recording medium, and then transferred to a large-capacity RAM in the video game machine for storage. Therefore, this technique is limited in applicability to the cartridge-type game machine.

In order to get around such problem, an information processing device of the present invention (new information processing device) is equipped with both an 8-bit CPU for the conventional information processing system CGB and a 32-bit CPU for the new so as to retain program compatibility (cartridge compatibility) therebetween. With a cartridge for the conventional information processing system CGB inserted, the 8-bit CPU system preferably operates, and the 32-bit CPU system operates responding to a game cartridge for the new information processing device.

For such preferable operation, there needs to be prepared for three subjects mentioned below.

Subject 1) Provide a function of identifying whether memory and a program stored in a cartridge are for the new information processing device or the information processing system CGB. Then, insert a cartridge into the new information processing device so that a voltage appropriate to drive the cartridge is automatically selected before the CPU system of the new information processing device is activated, and then determine which CPU is appropriate for a program stored in the cartridge. In this manner, there needs to switch a voltage to drive the inserted cartridge before the CPU system corresponding thereto is activated.

Subject 2) In order for the new information processing device to be operable with respect to both types of cartridges for the information processing system CGB and the new information processing device, a connector which is an external bus needs to be in 8-bit specifications in accordance with the information processing system CGB. If such connector is 8-bit specifications is used for data transfer between a cartridge and a corresponding CPU system, the number of bits of a data signal to be transferred is differed, 8 or 32 bits, depending on the type of cartridge for the information processing system CGB or the new information processing device. Further, if the CPU in the new information processing device is increased in size of a memory space compared with the conventional processing system CGB, the number of bits of an address signal is increased. Thus, the data width used for data transfer becomes larger to a greater degree. As such, there needs to appropriately switch the bus transfer mode based on the combination of the CPU and external bus differed in data width.

Subject 3) Further, the cartridge only for the new information processing device needs to be provided with a mechanism to deal with the above-described difference in data width, that is, a mechanism to deal with the bus transfer mode in which 32-bit data is transferable via the connector in 8-bit specifications.

As to the subject 1, conventionally, such technology has been disclosed that a slider is moved at the time of connection between an IC card and a connector, and then an incoming signal to the IC card is changed (Japanese Patent Laid-Open Publication No. 8-180149 (96-180149); hereinafter, "prior art 1"). Another is a technology of adapter for a memory card (Japanese Patent Laid-Open Publication No. 10-222621 (98-222621); hereinafter, "prior art 2"). Therewith, a power-supply voltage for a memory card to be inserted is changed depending on whether the memory card has a concave part or not.

Disclosure made in those prior arts 1 and 2 is changing the voltage or signal supplied to the IC card based on the shape of the IC card (or memory card) and nothing more than that. Therein, the operation of central processing means corresponding thereto is not disclosed at all.

As to the subject 2, the conventional information processing device, game machine, and the like, are provided with a processor and memory such as ROM and RAM. The processor and such memory are connected through a bus, and the processor carries out processing to read data stored in the memory or to write data thereinto. The bus is varied in type including a separate bus which is separated into an address bus and a data bus, and a multiplex bus which is obtained by time-sharing a common bus by address and data (or upper address and lower address, for example), and these two types of bus specifications are selected based on the specifications of the processor or memory.

Herein, a technology of switching the bus between the separate system and the multiplex system is disclosed in Japanese Patent Laid-Open Publication No. 5-204820 (93-204820) (hereinafter, "conventional technology 1") and Japanese Patent Examined Publication No. 6-42263 (94-42263) (hereinafter, "conventional technology 2"). These conventional technologies enable a single processor to access both memory of the separate system (hereinafter, "first memory") and memory of the multiplex system (hereinafter, "second memory").

However, with such conventional technologies 1 and 2, the number of bits of a data signal outputted to the first memory (or inputted from the first memory) is equal to the number of bits of a data signal outputted to the second memory (or inputted from the second memory). Therefore, those are not applicable to memories varied in type each having different number of bits of data signal.

Also with such conventional technologies 1 and 2, the central processing unit determines, based on an address space, which to access the first memory or the second memory. Consequently, those technologies are applicable only when the central processing unit is connected with the first and second memories simultaneously and fixedly. Those are not applicable if the central processing unit is selectively and exchangeably connected, via a connector, with any one memory among those varied in type (game cartridge, and the like).

On the other hand, with the progression of processor technology, processors equipped in information processing devices and game devices, for example, are started to increase in number of bits for data processing (also the number of bits of an address signal). If the number of bits for data processing is increased in the processors (also, with the larger number of bits of the address signal), memories corresponding thereto are also required to be wider in data width. In many cases, however, using memories narrower in data width may be rewarding, for example, cost-wise.

The information processing devices and game devices, for example, may have several processors varied in number of bits for data processing to ensure the compatibility with software developed in the past. Although the conventional type of game device including several processors is provided with a disk drive for optical recording media, if memory cartridges are used therefor, various types of game cartridges each corresponding to the processors equipped therein are connected via a connector. Here, such connector is preferably available for shared use among those various game cartridges. Therefore, one connector shall be connectable with memories each having different number of bits of data signal (also, each different number of bits of an address signal). In other words, there needs to make a bus available for connecting memories varying in data width.

As to the subject 3, there has been a technology of dealing with two types of memories differed in the number of bits of an address signal, but not yet a technology of dealing with two types of memories each having different number of bits of data signal. Needless to say, no disclosure has been made so far as to memory, in a cartridge having a function of discriminating whether stored memory and program are for the new information processing device or the information processing system CGB.

In order to get around the above-described subject 1, an object of the present invention is to provide an information processing device or a game system capable of discriminating between the new and conventional cartridges (program sources), differing in operation mode, for operation appropriate therefor. To realize such information processing device, before a CPU therein accessing memory in a cartridge engaged thereto, a driving voltage to the memory and the operation mode of the CPU are both changed depending on the engaged cartridge.

In order to get around the above-described subject 2, another object of the present invention is to provide an information processing device or a game system capable of discriminating between the new and conventional cartridges (program sources) differing in operation mode, for operation appropriate therefor. To realize such information processing device, manners of accessing the cartridges are switched depending on the engaged cartridge. Therefore, the cartridge becomes accessible in each different manner determined for each type of memory included therein.

Still another object of the present invention is to provide an information processing device or a game system in which a processor having relatively large number of bits for data processing accesses memory having relatively small number of bits of data.

In order to get around the above-described subject 3, still another object of the present invention is to provide a cartridge (storage device) having a mechanism corresponding to a multiplex bus transfer mode, which allows data transfer relatively large in quantity through a connector relatively narrow in data width. This cartridge is applied to such information processing devices as objected above.

SUMMARY OF THE INVENTION

In one preferable embodiment, in order to clear the above-described first subject, an information processing device of the present invention comprises a cartridge discriminator, a voltage supplier, and a central processing unit. This structure helps the information processing device execute processing based on data stored in memory whichever provided in a cartridge engaged thereto in a detachable manner. The cartridge is a first cartridge housing first memory driven by a first voltage or a second cartridge housing second memory driven by a second voltage. The first cartridge is provided with a marker to be discriminated from the second cartridge. Based on the marker, the cartridge discriminator discriminates between the first cartridge and the second cartridge. The voltage supplier supplies the first voltage when the cartridge discriminator identifies the engaged cartridge as being the first cartridge, and supplies the second voltage when identifies as being the second cartridge. The central processing unit becomes operational in a first mode when supplied with the first voltage, and in a second mode with the second voltage. As such, by first identifying the engaged cartridge and then selecting the driving voltage for the memory in the cartridge, the voltage supplied to the memory can be always appropriate. Further, the central processing unit determines its operation mode depending on the selected driving voltage.

In another preferable embodiment, in order to clear the above-described second subject, an information processing device of the present invention comprises an external bus having a first width, a cartridge discriminator, a central processing unit, a first access controller, a second access controller, and a selector. This structure helps the information processing device execute processing based on data stored in memory whichever provided in a cartridge engaged thereto in a detachable manner via the external bus. The cartridge is a first cartridge housing first memory of a first data width or a second cartridge housing second memory of a second data width. The second cartridge is provided with a marker to be discriminated from the first cartridge. Based on the marker, the cartridge discriminator discriminates between the first cartridge and the second cartridge. The central processing unit accesses the memory whichever housed in the engaged cartridge. The first access controller controls the external bus under a normal bus control method, and causes the central processing unit to access the first memory. The second access controller controls the external bus under a different method from the one for the first access controller, and causes the central processing unit to access the second memory. The selector selects the first access controller when the cartridge discriminator identifies the engaged cartridge as being the first cartridge, and selects said second access controller when identifies as being the second cartridge. As such, by identifying the data width of the memory based on the cartridge housing the memory, the information processing device can access the memory in the bus transfer mode appropriate therefor.

In still another preferable embodiment, in order to clear the above-described subject 3, a storage device of the present invention is provided in a first cartridge engageable to an information processing device in a detachable manner, and comprises general-purpose memory for storing data to be executed or utilized in the information processing device, and a multiplex bus converter. Here, the information processing device can be engaged with, in a detachable manner, either the first cartridge wherein an internal bus is of a first data width, or a second game cartridge wherein an internal bus is of a second data width narrower than the first data width. Further, the information processing device comprises a connector of the same data width as the second data width, and a central processing unit which accesses the first cartridge in the multiplex bus transfer mode when connected thereto via the connector, and in the normal bus transfer mode to the second cartridge. The general-purpose memory is of the first data width, and stores data which causes the central processing unit to execute processing. The multiplex bus converter controls address and data exchange between the central processing unit and the general-purpose memory in a time-sharing manner. As such, data exchange is achieved in a manner corresponding to the multiplex bus transfer mode in the information processing device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a circuit diagram showing connection, to a connector, of ROM in the first game cartridge, and an IC including both ROM and a multiaccess control part in the second game cartridge shown in FIG. 6;

FIG. 12 is a table in assistance of explaining a cartridge interface of the information processing device of FIG. 6;

DESCRIPTION OF THE PREFERRED EMBODIMENT

Figure 1:
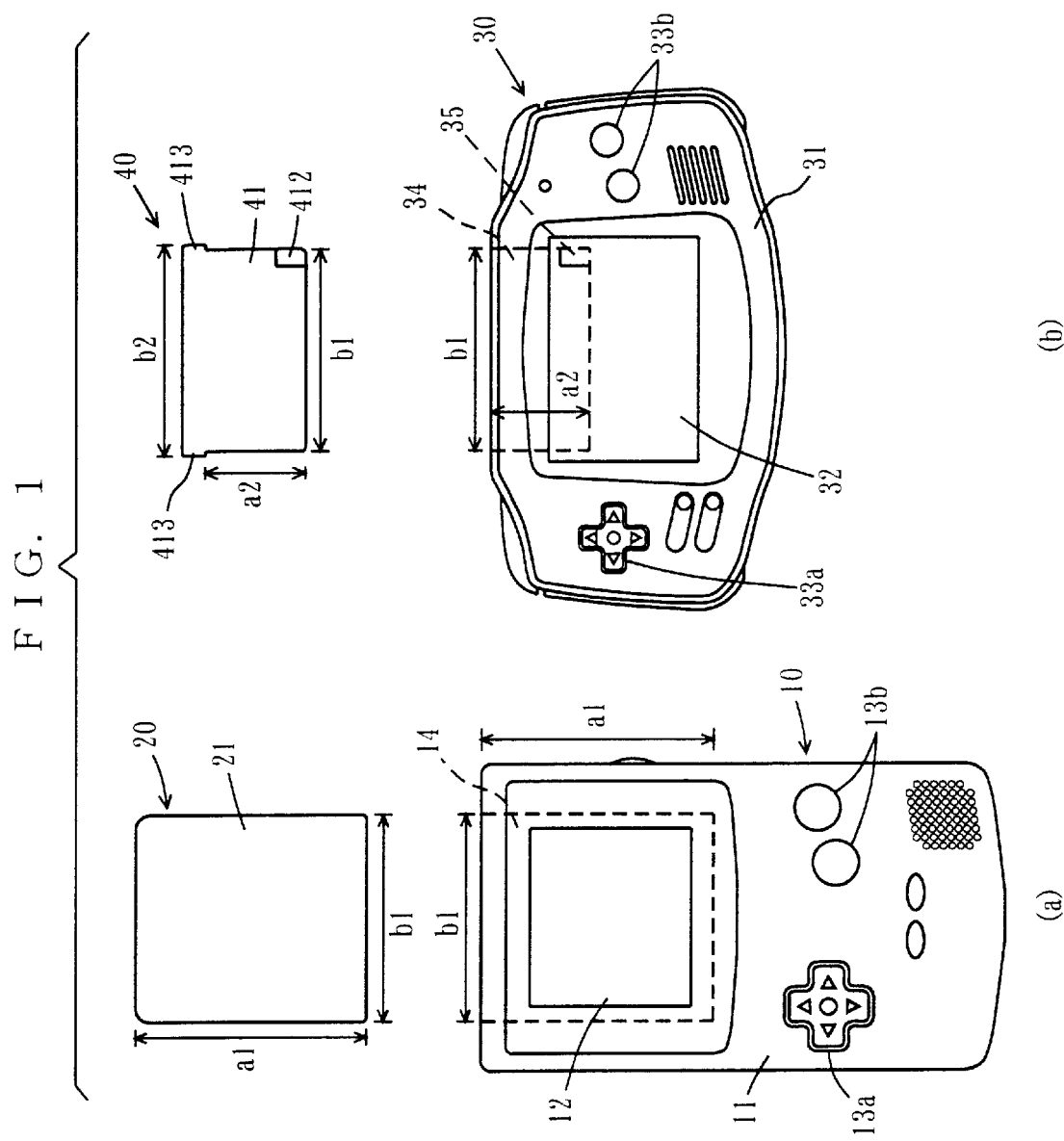
FIG. 1 shows external views of an information processing device of the present invention in assistance of explaining a principle thereof.
Figure 2:
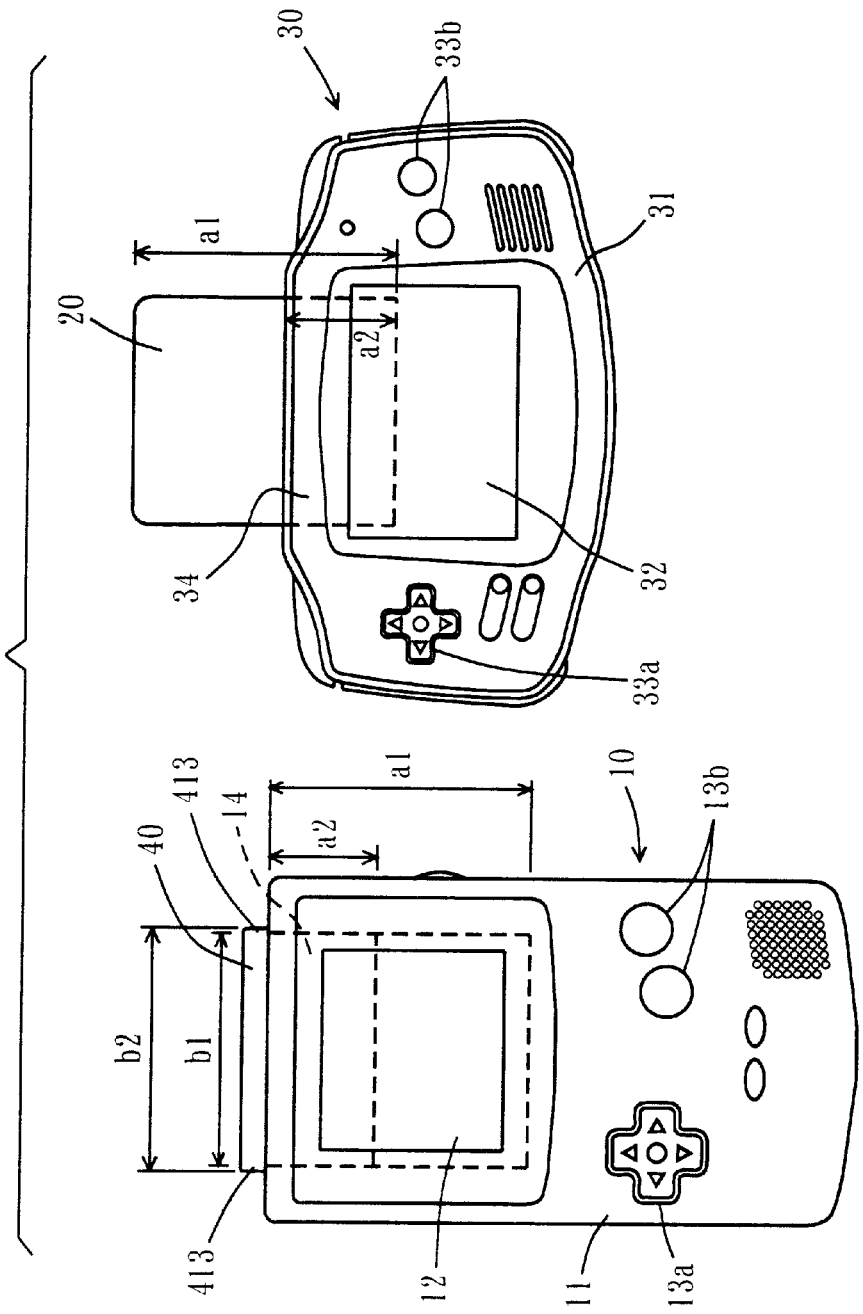
FIG. 2 shows another type of external views of the information processing device of FIG. 1 in assistance of explaining the principle thereof.
Figure 3:
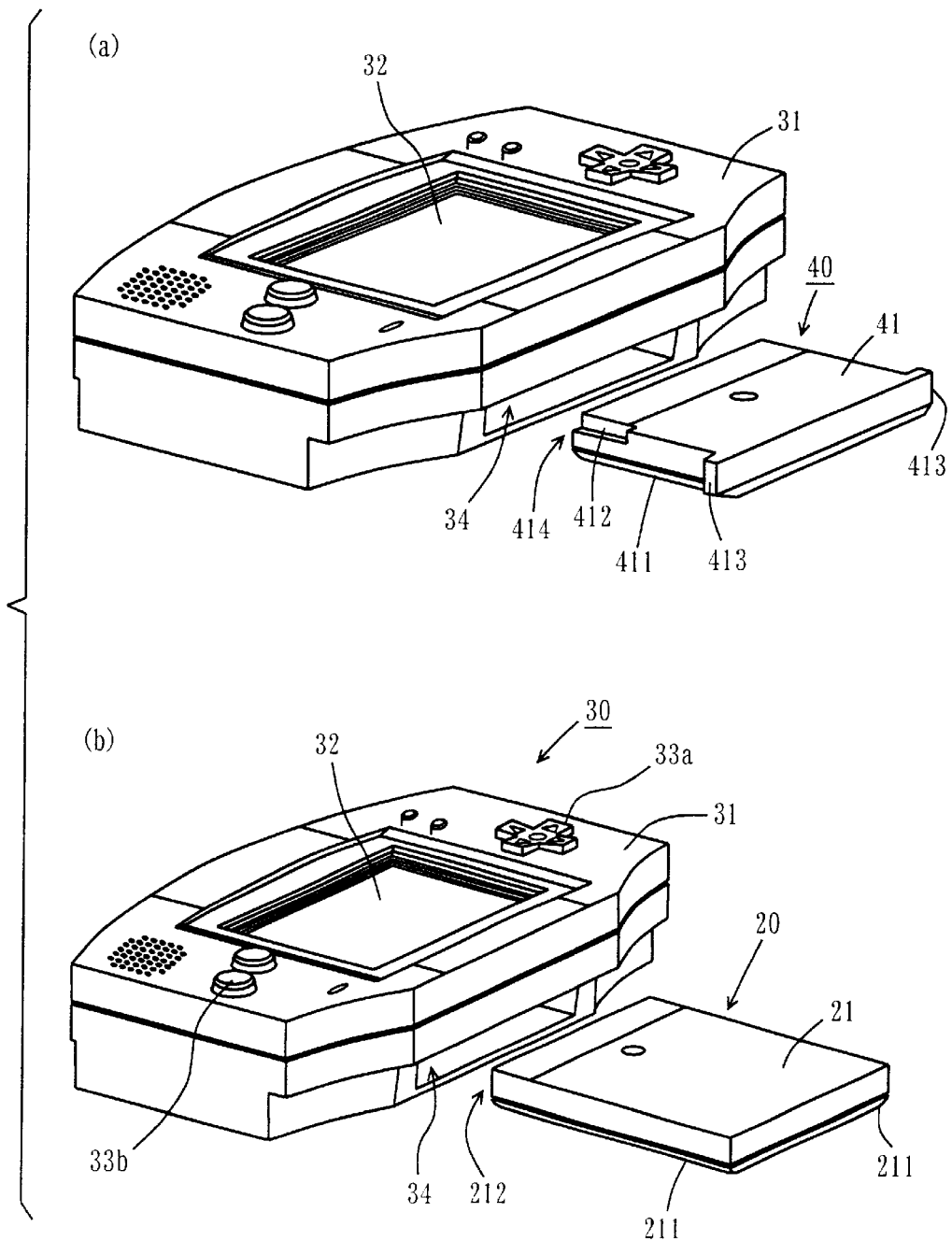
FIG. 3 shows slanted views demonstrating, respectively, a state when inserted into a second game machine in the information processing device of FIG. 1 is a first and a second game cartridges.

By referring to FIGS. 1 to 3, described is a case where an information processing device according to an embodiment of the present invention is applied to a game machine (or a game system structured by this game machine). Specifically, FIGS. 1 and 2 show external views of such game system in assistance of explaining the principle thereof. FIG. 3 shows slanted views demonstrating, respectively, a state when inserted into a second game machine, which is the characteristic of the present invention, is a first and a second game cartridges.

Figure 5:
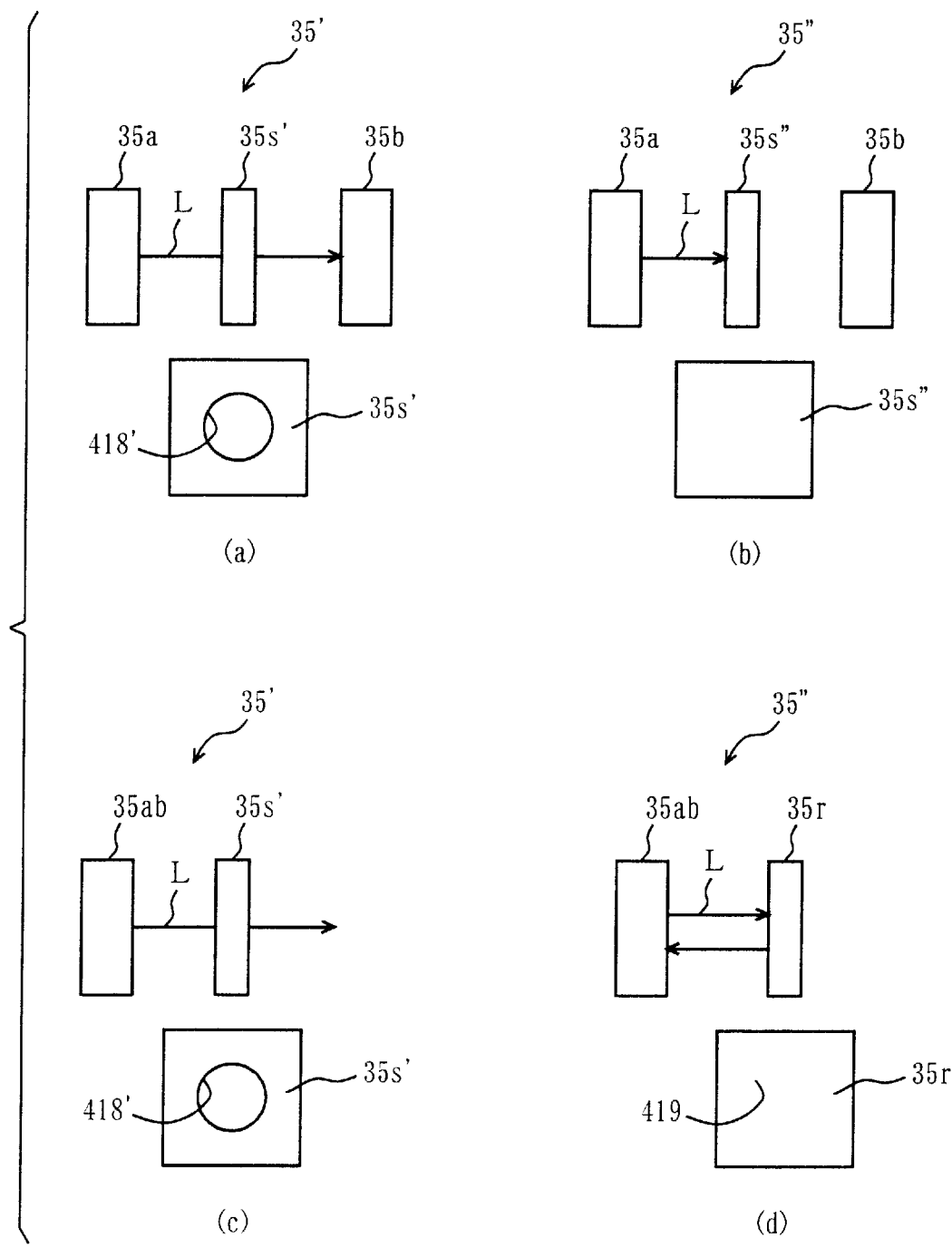
FIG. 5 shows diagrams in assistance of explaining a cartridge discrimination method utilizing a photoelectric sensor.
Figure 21:
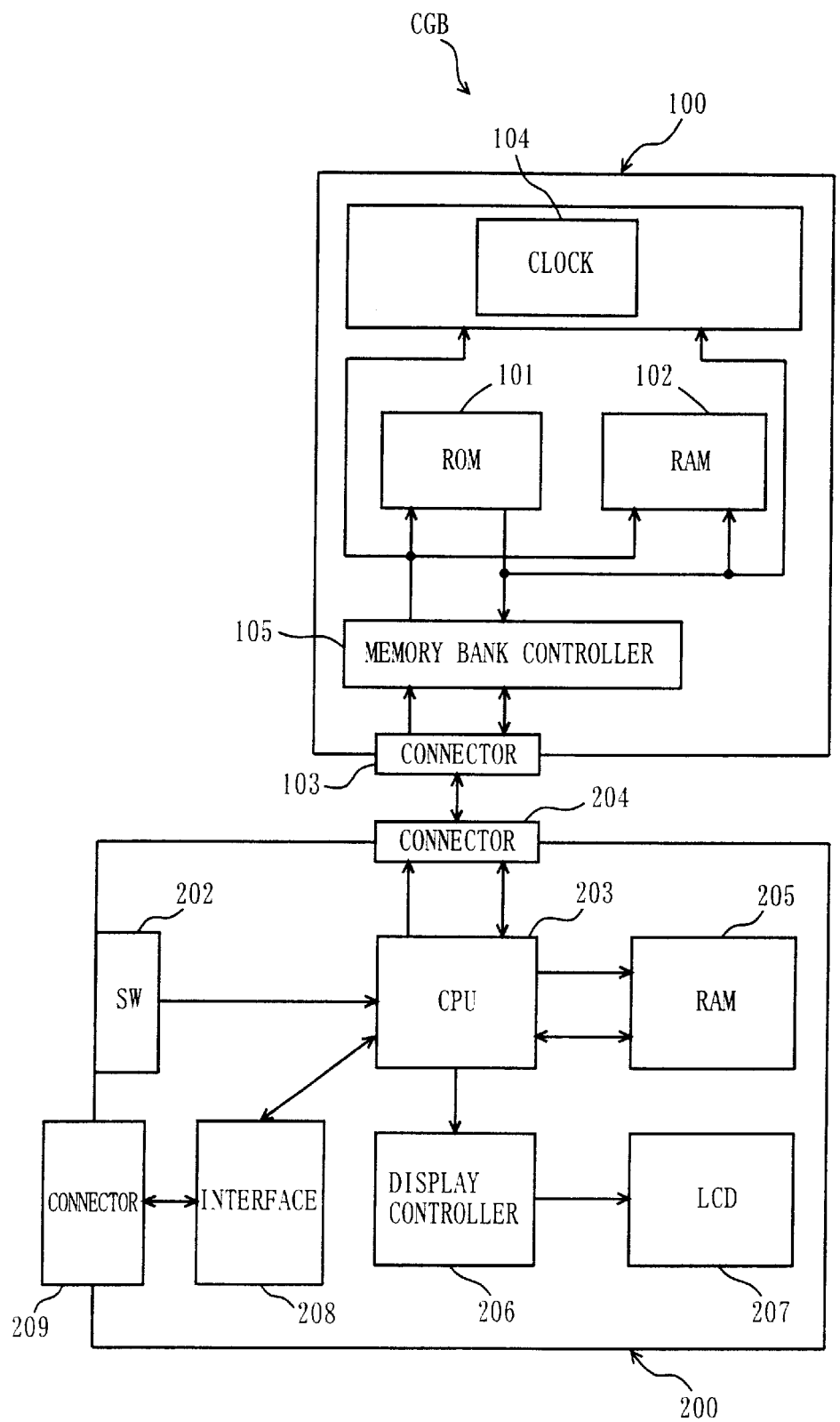
FIG. 21 is a block diagram showing the structure of a conventional information processing system CGB.
Figure 22:
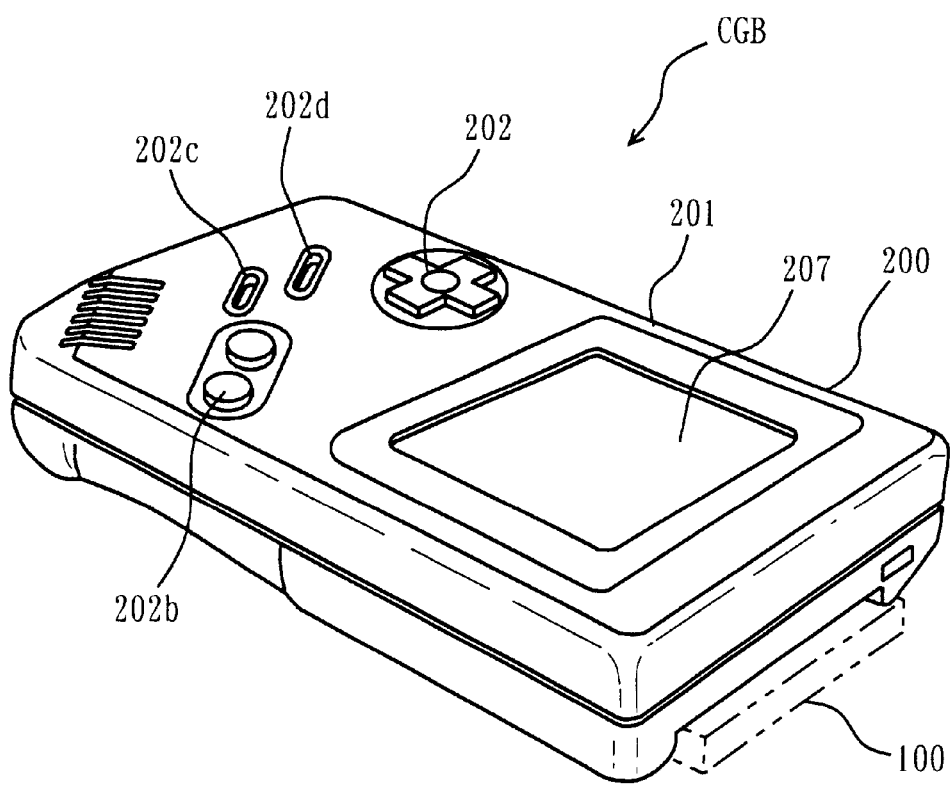
FIG. 22 shows an external view of the conventional information processing system CGB shown in FIG. 21.
Figure 23:
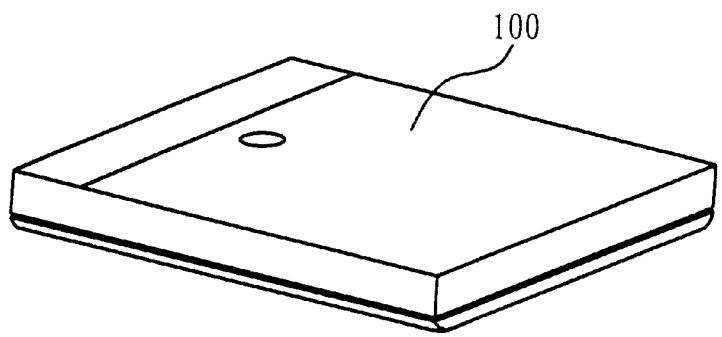
FIG. 23 shows an external view of the cartridge shown in FIG. 21.

In FIG. 1 and (a) of FIG. 3, the game system includes a first game machine 10 and a second game machine 30. Also included in the game system are a first game cartridge 20 mainly usable for the first game machine 10, and a second game cartridge 40 usable for the second game machine 30, both usable in a detachable manner. Here, those game cartridges 20 and 40 are information storage media having a game program stored therein, for example. The first game machine 10 corresponds to the above-described game machine 200 in FIG. 21, and the first game cartridge 20 corresponds to the program source 100 in FIG. 21. The first game machine 10 is equipped with a CPU with lower performance (e.g., equivalent in performance to an 8-bit circuit 361 of FIG. 5, which will be described later), and regarded as a low-end machine with lower throughput (conventional type). On the other hand, equipped in the second game machine 30 is a CPU with higher performance, and regarded as a high-end machine (new type). Here, the CPU in the second game machine 30 is to be a 16-bit or 32-bit CPU, for example, being higher in throughput than the first game machine 10. Such CPU is exemplified by a 32-bit circuit 362 of FIG. 5, which will be also described later. The second game machine 30 is additionally provided with another CPU equivalent in performance to the CPU (8-bit circuit 361 of FIG. 5) in the first game machine 10 for compatibility.

As to the first game cartridge 20, a housing 21 thereof is rectangular or almost square in shape, and its dimensions are a1 high by b1 wide by c1 deep. One plane of the housing 21 is so formed as to inwardly slant at both sides thereof to prevent confusion about which plane is the top side, and such slanted plane is denoted by a reference numeral 211. Also, the first game cartridge 20 is internally provided with a circuit board (not shown) having mounted thereon a semiconductor memory such as ROM 22 with a game program stored. This game program is executed by the CPU in the first game machine 10, or the CPU (the 8-bit circuit 361) in the second game machine 30 equivalent in performance to the CPU in the first game machine 10. Here, in the ROM 22, the number of bits of a data signal is 8, that of an address signal is 16, and the driving voltage is 5V. One side surface of the first game cartridge 20 has an aperture 212, and therefrom, a plurality of connection terminals (not shown) formed on one side of such circuit board are protruding. Here, those connection terminals structure an edge connector (not shown).

As to the first game machine 10, a housing 11 thereof carries a liquid crystal display 12 on the upper part of one plane (same plane as shown in (a) of FIG. 1). On the lower part thereof, found are a direction switch 13a and an action switch 13b. On the other plane of the housing 11, a concave part 14 is formed on the upper part thereof for cartridge insertion. This concave part 14 is in almost the same size as the first game cartridge 20 (a1(H)×b1(W)×c1(D)) so as to accept the first game cartridge 20 therein. Here, the height of the concave part 14 may be shorter than the height a1. Inside the concave part 14, the connector (not shown) is provided for electrical connection among the first game cartridge 20 and various electrical components such as CPU in the first game machine 10. Accordingly, once inserted into the concave part 14, the first game cartridge 20 perfectly fits therein, and the connection terminals of the first game cartridge 20 are electrically connected to the connector of the first game machine 10. In this case, the first game machine 10 supplies a first driving voltage (e.g., 5V) to the first game cartridge 20.

Figure 6:
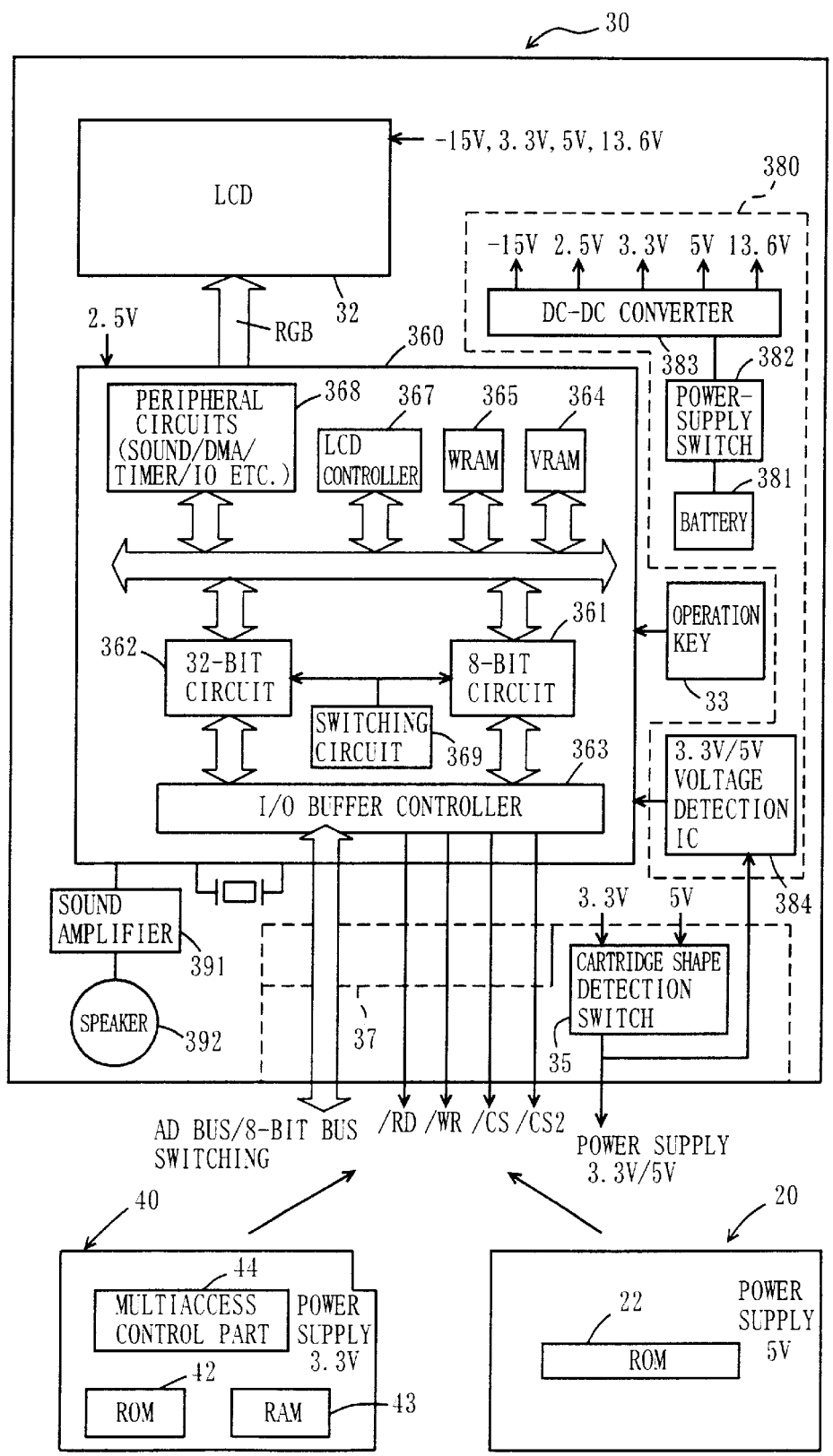
FIG. 6 is a block diagram showing the system structure of the information processing device of FIG. 1.
Figure 7:
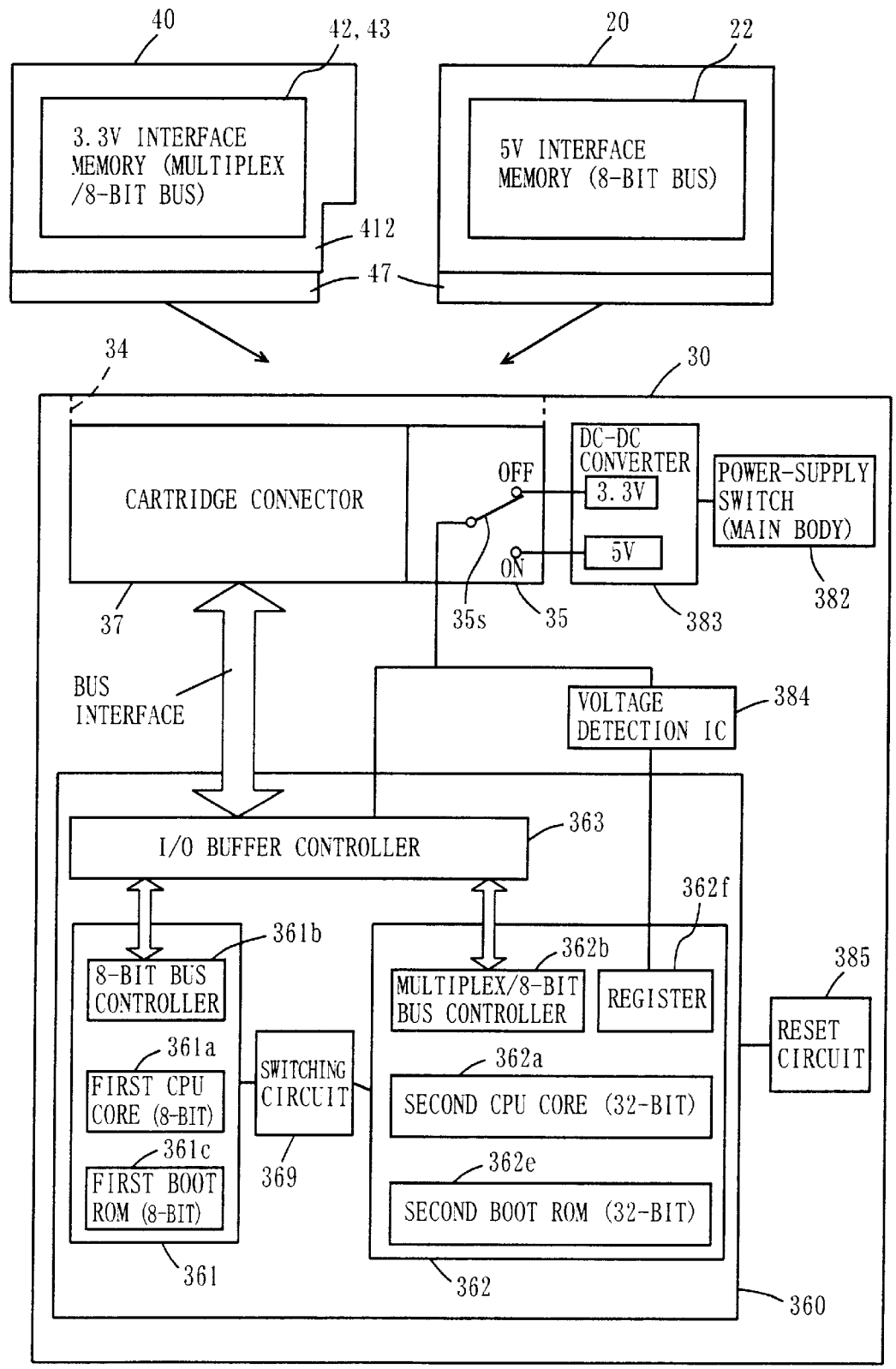
FIG. 7 is a block diagram showing main parts relevant to a cartridge discrimination function of the information processing device of FIG. 6.

As to the second game cartridge 40, a housing 41 thereof is also rectangular in shape as is the housing 21 of the first game cartridge 20, and its dimensions are a2 high by b1 wide by c1 deep. Here, although the height a2 is shorter (a2<a1) than the housing 21, the width and depth are the same. As such, by structuring the second game cartridge 40 in the same width and depth as the first game cartridge 20, a concave part 34 of the second game machine 30 can accept both the first and second game cartridges 20 and 40. Note here that, the width and depth of the first and second game cartridges 20 and 40 are determined according to the purpose of the present invention. Similarly to the housing 21 of the first game cartridge 20, one plane of the housing 41 is so formed as to inwardly slant at both sides thereof, and such slanted plane is denoted by a reference numeral 411. Here, as to the second game cartridge 40, for the purpose of distinguishing from the first game cartridge 20 by shape, a groove 412 is formed along one side plane, at the end where abutting the concave part 34 when inserted. The groove 412 is exemplified for a to-be-detected part in claims. Here, the groove 412 may be formed on both side planes of the second game cartridge 40 if considered appropriate in terms of design. The second game cartridge 40 also has a protrusion 413 formed, as a stopper when inserted, at one or both ends of one lateral side, which is not the side inserted into the concave part 14 of the first game machine 10. Therefore, the lateral side with the protrusion(s) becomes somewhat longer than the other (b2), which is equal in length to the first cartridge 20. The second cartridge 40 includes semiconductor memory such as ROM 42 (FIG. 6) having stored a game program to be executed by the 32-bit CPU (the 32-bit circuit 362) of the second game machine 30, and RAM 43 (FIG. 6) for storing backup data, and a circuit board 45 (FIG. 9) having mounted thereon various types of integrated circuits (ICs) such as a multiaccess control part 44 (FIG. 6). Here, in the ROM 42, the number of bits of a data signal is 16, that of an address signal is 24, and the driving voltage is 3.3V. As to the RAM 43, the number of bits of a data signal is 8, that of an address signal is 16, and the driving voltage is 3.3V. One side surface of the second game cartridge 40, which is the side inserted into a game machine, has an aperture 414, and therefrom, a plurality of connection terminals (or contacts) 46 (FIG. 9) formed on one side of the circuit board 45 are protruding. Here, those connection terminals 46 structure an edge connector 47 (FIG. 7).

As to the second game machine 30, a housing 31 thereof carries a liquid crystal display 32 on the center part of one plane (same plane as shown in (b) of FIG. 1). Also, with respect to the liquid crystal display 32, a direction switch 33a is placed on the left and an action switch 33b on the right. On the other plane of the housing 31, the concave part 34 is formed on the upper part thereof for cartridge insertion. This concave part 34 is in almost the same size as the second game cartridge 40 (a2(H)×b1(W)×c1(D)) so as to accept the second game cartridge 40 therein. Here, the height of the concave part 34 may be shorter than the height a2. Inside the concave part 34, a connector 37 is provided for electrical connection among the second game cartridge 40 and various electrical components such as CPU in the second game machine 30. Accordingly, once inserted into the concave part 34, the second game cartridge 40 perfectly fits therein. In this case, the second game machine 30 supplies a second driving voltage (e.g., 3.3V) to the second game cartridge 40.

Next, by referring to FIGS. 2 and 3, assuming that the second game cartridge 40 is inserted into the first game machine 10 and the first game cartridge 20 to the second game machine 30.

As shown in (a) of FIG. 2, if the second game cartridge 40 is inserted into the first game machine 10, the connection terminals 46 of the second game cartridge 40 do not reach the connector of the first game machine 10, and thus no appropriate connection is established. This is because the height a2 of the second game cartridge 40 is not long enough as the height a1 for the connector of the first game machine 10. Also, the protrusion 413 works as a stopper with respect to the lateral side of the concave part 14. Accordingly, no power-supply voltage is supplied from the first game machine 10 to various IC components including the semiconductor memory in the second game cartridge 40 via the connection terminals 46. Thus, those IC components are successfully protected from corruption often caused by overvoltage.

On the other hand, as shown in (b) of FIGS. 2 and 3, described now is the case that the first game cartridge 20 is inserted into the second game machine 30. In this case, as the height a1 of the first game cartridge 20 is longer than the height a2 of the concave part 34 (a2<a1), the connection terminals of the first game cartridge 20 reach the connector 37 of the second game machine 30, and thus electrical connection is established. Here, as is a2<a1, the first game cartridge 20 does not perfectly fit in the concave part 34, and thus is left visible by the difference of a1–a2. At this time, the driving voltage supplied from the second game machine 30 to the first game cartridge 20 is the first driving voltage (5V) instead of the second (e.g., 3.3V).

As is known from the above, the first game cartridge 20 is usable to both the first and second game machines 10 and 30, and thus compatibility with the high-end machine is successfully achieved. As to the second game cartridge 40 usable only to the second game machine 30, even if erroneously inserted into the first game machine 10, no electrical connection is established. The semiconductor memory, for example, in the cartridge thus can be protected from corruption often caused by overvoltage.

In this example, the driving voltage for the second game cartridge 40 is lower than that for the first game cartridge 20. This is because the second game cartridge 40 is equipped with electrical components of types driven by lower voltage to reduce power consumption. If there is no need to reduce power consumption, the power-supply voltage to both game machines may be in the same level. If so, the second game machine 30 has no more need to change the voltage level depending on which cartridge is now engaged to itself.

Figure 4:
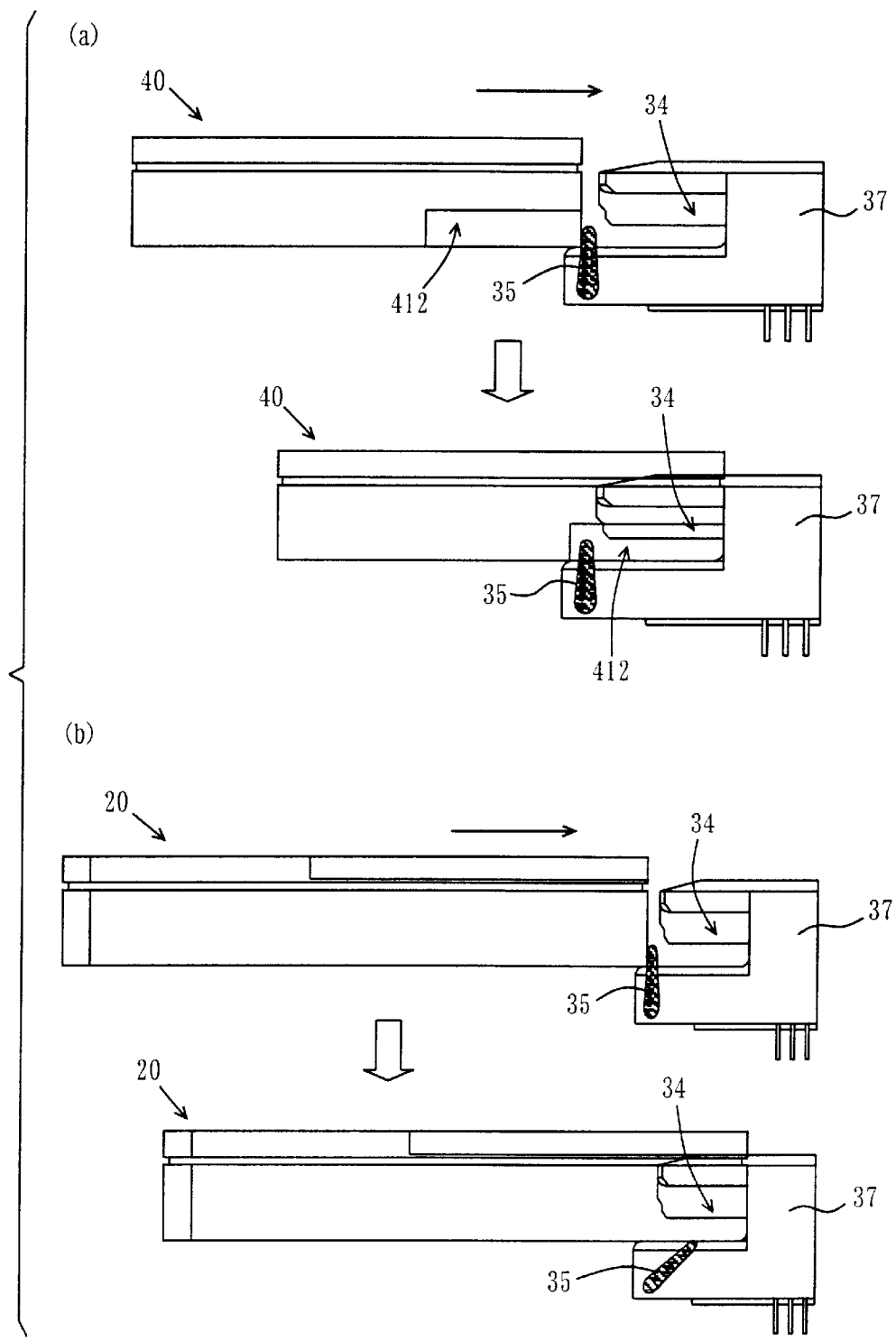
FIG. 4 shows diagrams in assistance of explaining a cartridge discrimination method in the information processing device of FIG. 1.

With reference to FIG. 4, described next is a method how to discriminate between the first and second game cartridges 20 and 40. Here, the method demonstrated in FIG. 4 utilizes a cartridge shape detection switch (hereinafter, referred to simply as "detection switch") 35 to detect any difference in shape. Such method is described in detail below.

The detection switch 35 is exemplified by a selector switch, and placed in the vicinity of the connector 37. The detection switch 35 is selectively connected with either a 3.3V output terminal or a 5V output terminal provided in a DC-DC converter 383 (FIG. 6). With such structure, thus selected power-supply voltage is supplied to a power-supply terminal of the cartridge currently engaged to the connector 37. In the initial state, the detection switch 35 is structured to be connected to the 3.3V output terminal.

FIG. 4(a) shows, views from side, before and after the second game cartridge 40 being inserted into the concave part 34 of the second game machine 30. In this example, the detection switch 35 is placed in the vicinity of a side end part of the concave part 34. Therefore, even if the second game cartridge 40 is inserted into the concave part 34, the detection switch 35 is prevented from abutting the second game cartridge 40 due to the groove 412. In such structure, the detection switch 35 remains in the initial state, and thus the second game machine 30 detects the cartridge as being the second game cartridge 40, and supplies the voltage of 3.3V therefor.

FIG. 4(b) shows, views from side, before and after the first game cartridge 20 being inserted into the concave part 34 of the second game machine 30. Unlike the second game cartridge 40, the housing 21 of the first game cartridge 20 has no groove 412 formed. Therefore, the detection switch 35 is pushed down by an end part of the housing 21, and thus the second game machine 30 detects the cartridge as being the first game cartridge 20. The voltage of 5V is thus supplied to the first game cartridge 20.

Here, described above is the case of the second game cartridge 40 having the groove 412. This is not restrictive, and the first game cartridge 20 maybe the one provided with the groove. Also, instead of the groove, a protrusion may be provided in a position where abutting the detection switch 35. If these are the cases, the detection switch 35 should be in the initial position connected to the 5V output terminal. Also, the processing is carried out in a different manner from that for the example of FIG. 4.

In this example, cartridge discrimination by shape between the first and second cartridges 20 and 40 is done by mechanically contacting the detection switch 35 to the currently engaged cartridge. Alternatively, cartridge discrimination can be done without contacting the detection switch 35 to the cartridge. Such non-contacting cartridge discrimination is carried out exemplarily in a photoelectric sensor system and a read switch system.

FIGS. 5(a) and 5(b) exemplarily show the photoelectric sensor system, which is an exemplary transmission-type for identifying the cartridge based on whether light L is transmissible or not. In FIGS. 5(a) and (b), detection switches 35' and 35" both include a light-emitting unit 35a and an optical sensor 35b. In FIG. 5(a), a rib 35s' having an aperture 418' is additionally included. In FIG. 5(b), a rib 35s" having no aperture is included instead of the rib 35s'. Such structured rib 35s' or rib 35s" is provided in the first and second game cartridge 20 and 40, while the light-emitting unit 35a and the optical sensor 35b in the concave part 34. Accordingly, the cartridge can be identified based on whether the light L is transmitted or not.

The photoelectric sensor system shown in FIGS. 5(c) and (d) is an exemplary reflection-type for identifying the cartridge based on whether the light L is reflectable or not. Here, in FIGS. 5(c) and (d), detection switches 35' and 35" both include a light emitting/receiving unit 35ab. In FIG. 5(c), the rib 35s' as above is also included, and the FIG 5(d), include is a rib 35r which is similar to the rib 35s" but additionally has a reflection plane 419 reflecting the light L. Such structured rib 35s' or rib 35r is provided in the first and second game cartridge 20 and 40, and the light emitting/receiving unit 35ab in the concave part 34. Accordingly, the cartridge can be identified based on whether the light L is reflected or not.

Other than the above, cartridge discrimination between the first and second game cartridges 20 and 40 can be done in the read switch system. In the system, a magnetic substance provided to the cartridge drives a selector 35s (FIG. 7) of the detection switch 35 provided in the concave part 34.

Next, by referring to FIG. 6, the system block of the game system and game cartridge according to the embodiment of the present invention is roughly described. Here, FIG. 6 is a block diagram showing the game system and game cartridge.

In FIG. 6, the information processing system of the present invention is mainly composed of the first and second game cartridges 20 and 40, and the second game machine 30. The first and second game cartridges 20 and 40 each store information such as program necessary for the second game machine 30 to display images and execute a game, and structured to be engageable to the second game machine 30 in a detachable manner as described above.

The second game machine 30 includes the liquid crystal display (LCD) 32, the connector 37, a central processing unit (CPU) 360, and a power-supply unit 380. The CPU 360 includes both the 8-bit circuit 361 and the 32-bit circuit 362, and is a unit of a dual processor type. The 8-bit circuit 361 is equivalent in performance to the CPU (not shown) equipped in the first game machine 10, which is a low-end machine with lower throughput carrying out 8-bit operation. As to the 32-bit circuit 362, its performance is high and unique to the second game machine 30, and carries out 32-bit operation, for example. To the 8-bit and 32-bit circuits 361 and 362, through buses, connected are an I/O buffer controller 363, video RAM (V-RAM) 364, working RAM (W-RAM) 365, an LCD controller 367, and peripheral circuits 368. The peripheral circuits 368 perform sound processing, DMA (direct memory access), timer control, input/output control, and the like.

To the CPU 360, connected are the liquid crystal display 32, the power-supply unit 380, an operation key 33, a sound amplifier 391, and a speaker 392. The power-supply unit 380 includes a power supply 381, a power-supply switch 382, the DC-DC converter 383, and a voltage detection IC 384. The power supply 381 is preferably a battery, and supplies power to the DC-DC converter 383 via the power-supply switch 382. The DC-DC converter 383 performs voltage transform to the direct-current power provided by the power-supply 381, and generates direct voltages varied in level (e.g., −15V, 2.5V, 3.3V, 5V, and 13.6V). Responding to the user's (or the player's) operation on the operation key 33, the CPU 360 executes the program stored in the ROM 22 or 42 equipped in the first or second game cartridge 20 or 40. Thus, based on the result obtained thereby, a game image is displayed on the LCD 32, and sound (or sound effects) corresponding to the game image is outputted from the speaker 392.

The CPU 360 is also connected with the connector 37 in the concave part 34. In relation to the position of the connector 37, the detection switch 35 exemplified by a selector-type microswitch is provided. As already described, the detection switch 35 detects which of the first and second game cartridges 20 and 40 is inserted into the concave part 34, that is, engaged with the second game machine 30. Specifically, the detection switch 35 detects whether the inserted cartridge has the groove 412 or not. If the groove 412 is detected, the detection switch 35 determines that the inserted cartridge as being the second game cartridge 40, otherwise determines as being the first game cartridge 20. If detected is the second game cartridge 40, the detection switch 35 selects the power-supply voltage of 3.3V for supply thereto. On the other hand, if detected is the first game cartridge 20, selected is the power-supply voltage of 5V. The CPU 360 also includes a switching circuit 369, which activates either the 8-bit circuit 361 or the 32-bit circuit 362 in response to the output from the detection switch 35.

FIG. 7 is a block diagram showing parts mainly used to discriminate between the first and second game cartridges 20 and 40 in the second game machine 30 shown in FIG. 6. Specifically, in the second game cartridge 40, the ROM 42 and RAM 43 structure 3.3V interface memory. The 3.3V interface memory enables data transfer in the multiplex mode (details are left for later description). In the first game cartridge 20, the ROM 22 is 5V interface memory.

The CPU 360 includes the switching circuit 369, which selectively activates either the 32-bit circuit 362 or the 8-bit circuit 361 in response to a value of a register 362f provided by the voltage detection IC 384. In more detail, the 32-bit circuit 362 includes a second boot ROM 362e, a second CPU core 362a, the register 362f, and a multiplex/8-bit bus controller 362b. Here, the term "second" denotes the 32-bit operation unique to the second game machine 30.

The 8-bit circuit 361 includes a first boot ROM 361c, a first CPU core 361a, and an 8-bit bus controller 361b. Here, the term "first" denotes the 8-bit operation unique to the first game machine 10.

A reset circuit 385 resets the CPU 360.

The detection switch 35 includes the selector 35s which is selectively connected with either the 3.3V output terminal or the 5V output terminal in the DC-DC converter 383 so that the voltage from thus selected output terminal goes to the cartridge inserted into the concave part 34. Note that, in this example, the selector 35s is located at the 3.3V output terminal when no cartridge is in the concave part 34. That is, in the second game machine 30, 3.3V is the reference driving voltage in the memory system.

In this example, described next is a method of uniquely determining an output voltage based on the cartridge type (the first or second game cartridge 20 or 40). As described in the foregoing, the detection switch 35 is placed in a part where the first game cartridge 20 partially abuts the selector 35s when inserted into the concave part 34.

With such structure, the selector 35s is pushed toward the 5V output terminal side as the first game cartridge 20 is coming into the concave part 34. Thus, the selector 35s is not connected with the 3.3V output terminal in the initial position any more, but is securely connected with the 5V output terminal and then retained at the other possible position. With the selector 35s being connected to the 5V output terminal, the first game cartridge 20 is electrically connected to the connector 37, and then is supplied with the DC output of 5V from the DC-DC converter 383.

As described above, the second game cartridge 40 is so shaped as not to abut the selector 35s on the way coming into the concave part 34. Thus, after the second game cartridge 40 is completely inserted into the concave part 34, the selector 35s remains biased and connected to the 3.3V output terminal. As a result, the second game cartridge 40 is supplied with the DC output of 3.3V for the DC-DC converter 383.

Figure 8:
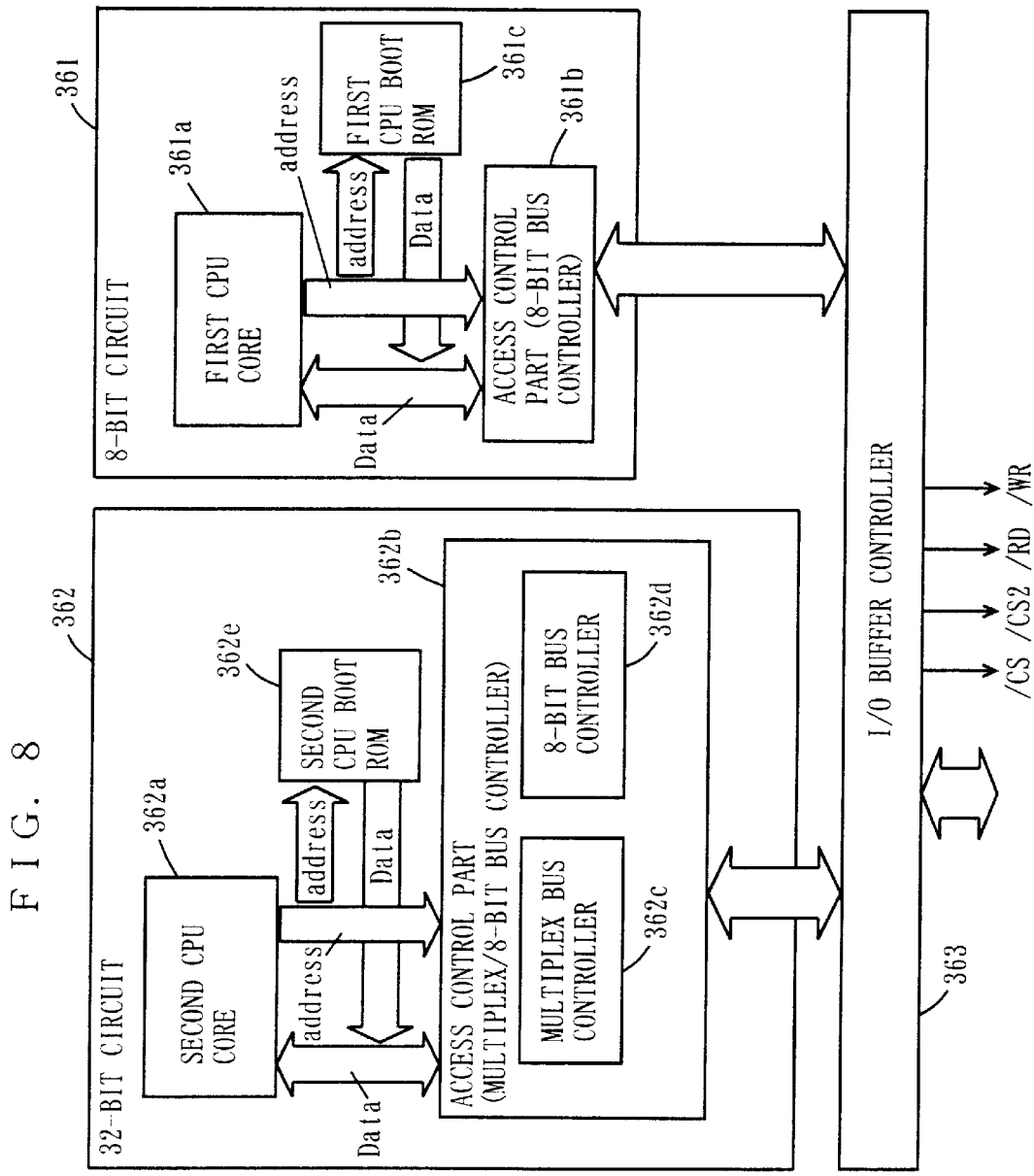
FIG. 8 is a block diagram showing main parts relevant to bus control in an 8-bit circuit and a 32-bit circuit shown in FIG. 6.

FIG. 8 is a block diagram showing the detailed structures of the 8-bit circuit 361 and the 32-bit circuit 362 shown in FIG. 7. In FIG. 8, the 8-bit circuit 361 includes the first CPU core 361a, the first access control part (8-bit bus controller) 361b, and the first boot ROM 361c. The first CPU core 361a processes an activation program stored in the first boot ROM 361c, and also carries out game processing based on a program for the first game machine 10 stored in the ROM 22 in the first game cartridge 20. The first CPU core 361a accesses the ROM 22 via the access control part 361b.

The 32-bit circuit 362 includes the second CPU core 362a, the second access control part (or multiplex/8-bit bus controller) 362b, and the second boot ROM 362e. In more detail, the access control part 362b includes a multiplex bus controller 362c, and an 8-bit bus controller 362d. The second CPU core 362a processes an activation program stored in the boot ROM 362e, and also carries out game processing based on a program for the second game machine 30 stored in the ROM 42 in the second game cartridge 40. The second CPU core 362a accesses the ROM 42 and RAM 43 in the second game cartridge 40 via the access control part 362b. In more detail, when controlling the ROM 42 for reading, the multiplex bus controller 362c provides, with a first timing to the ROM 42, address data A0 to A23 for accessing the ROM 42, and receives data D0 to D15 with a second timing. Accordingly, a bus line is partially shared when providing and receiving data. The 8-bit bus controller 362d performs, when controlling the RAM 43 for data writing or reading, access control in the similar manner to the 8-bit CPU. Depending on which of the ROM 42 and the RAM 43 is accessed by the CPU, selection is made between the multiplex bus controller 362c and the 8-bit bus controller 362d (specifically, as will be later described, this selection is made according to the memory space assessed by the CPU).

Figure 9:
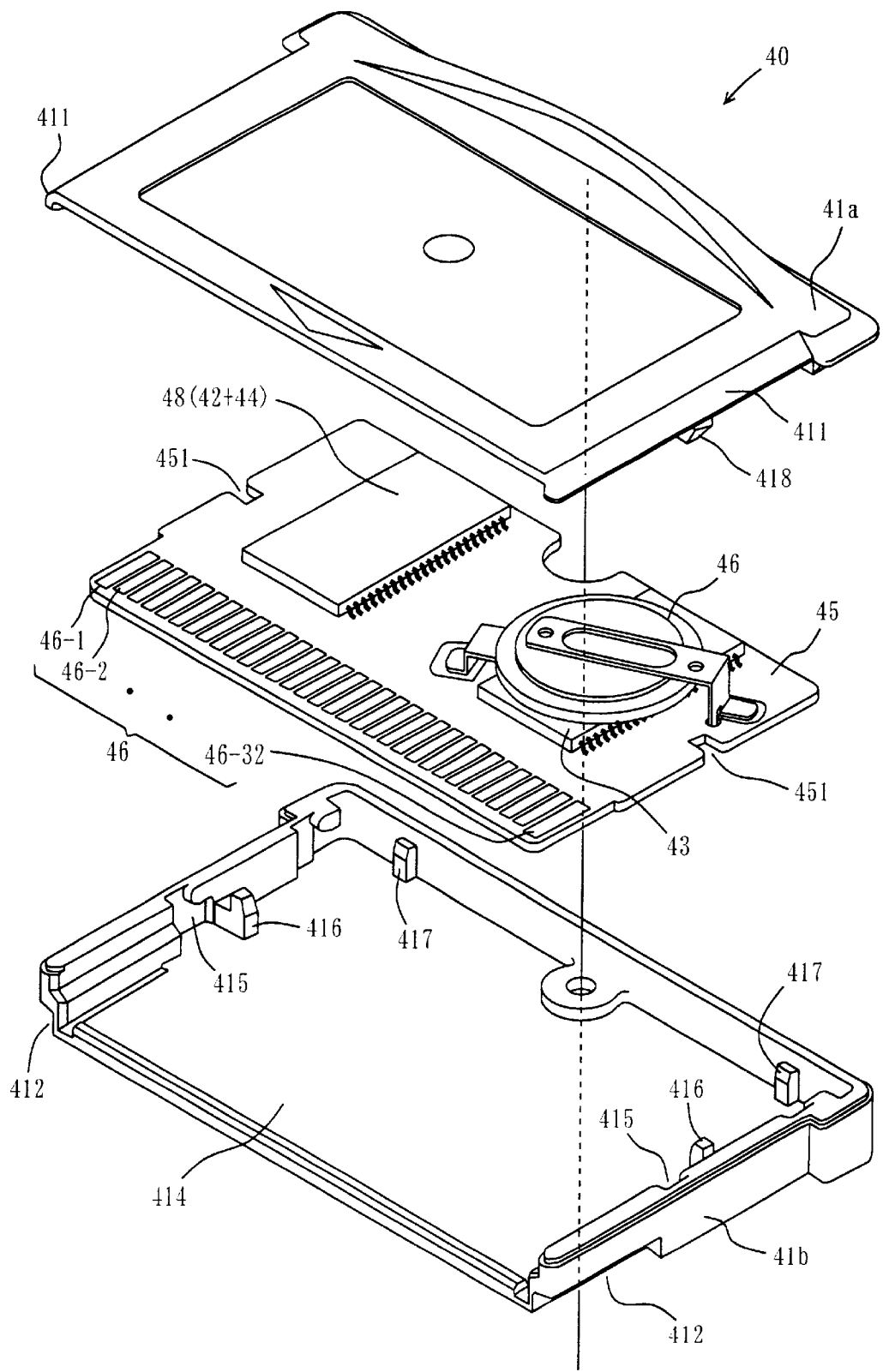
FIG. 9 is a slanted view showing the detailed structure of the second game cartridge shown in FIG. 1.

Referring to FIG. 9, described next is the internal structure of the second game cartridge 40. Here, FIG. 9 is a slanted view showing the detailed structure of the second game cartridge 40. In FIG. 9, the housing 41 of the second game cartridge 40 is mainly composed of an upper housing 41a and a lower housing 41b. The lower housing 41b has walls on both side planes and an upper side, and the inner side of the walls on the side planes each have a concave part 415. In the vicinity of the concave part 415 and on the inside plane of the lower housing 41b, a protrusion 416 is formed for positioning the circuit board 45. Another protrusion 417 (two, in the drawing) is formed on the inner side of the wall on the upper side. The upper housing 41a has still another protrusion (not shown; as many as the protrusion 417) in a position opposing to the protrusion 417. The protrusion formed on the upper housing 41a is engaged in between the protrusion 417 and the side wall of the lower housing 41b. Consequently, the upper and lower housings 41a and 41b can be held in position with limited lateral movement. The upper housing 41a also has ribs each formed in a part opposing to the side walls of the lower housing 41b for engagement therewith. Further, the upper housing 41a has a convex part 418 in a part opposing to each concave 415.

On the circuit board 45, a one-chip IC 48 including the ROM 42 and the multiaccess control part 44 is mounted, and as required, the RAM 43 and a backup battery 46 are also mounted. On the circuit board 45, the ROM 42, RAM 43, and battery 46 are connected as appropriate in a desired circuit pattern for electrical connection between those components and externals. The outer edge of the circuit board 45 has notches 451 for engagement with the protrusions 416. On the lower end part of the circuit board 45, a plurality of connection terminals 46 (46-1 to 46-32) are aligned with predetermined intervals. Those connection terminals 46-1 to 46-32 expose from the aperture 414 of the housing 41, and connected to the connector 37 of the second game machine 30. Accordingly, those connection terminals 46-1 to 46-32 formed on the lower side of the circuit board 45 structure an edge connector 47. Here, the edge connector 47 is in the same structure as that in the first game cartridge 20. Here, the "structure" means the shape of the lower side of the circuit board 45, and alignment, interval between any two, and the number of the connection terminals.

In this embodiment, the ROM 42 and the multiaccess control part 44 are in the one-chip IC. This is not restrictive, and the multiaccess control part 44 may be separately provided and wired to the ROM 42. This structure is advantageously easy to manufacture. Also, the ROMs 42 and 22 may be non-rewritable mask ROM, rewritable flash ROM, or the like.

Figure 10:
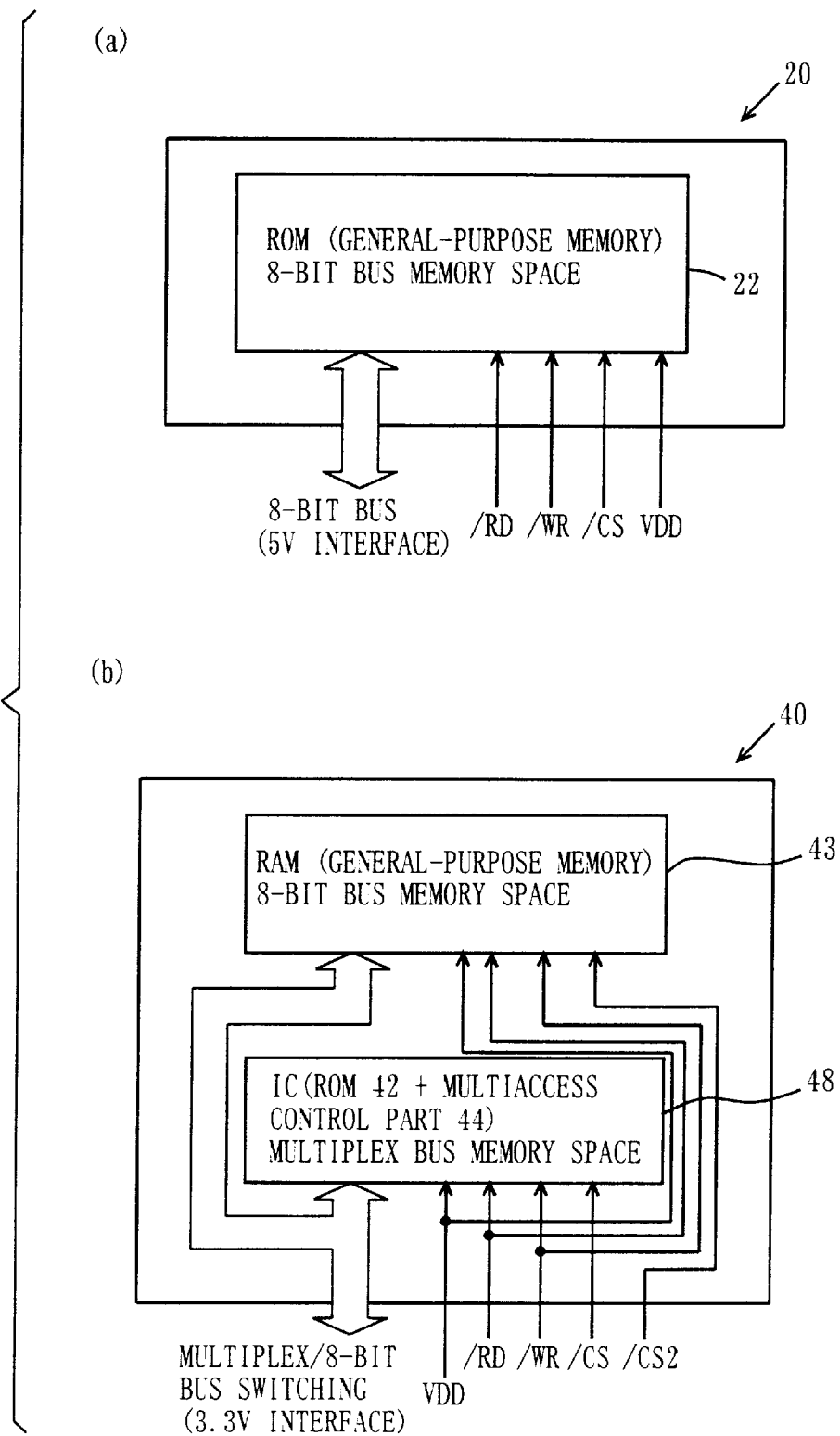
FIG. 10 shows block diagrams each showing the detailed structure of the first and second game cartridges shown in FIG. 6.

Next, by referring to FIGS. 10 and 11, the detailed functional structures of the first and second game cartridges 20 and 40 are described. Here, FIG. 10 shows block diagrams showing the detailed structures of the first and second game cartridges 20 and 40, and FIG. 11 is a circuit diagram showing connection, to the connector 47, of ROM 22 in the first game cartridge 20, and the IC 48 including both ROM 42 and the multiaccess control part 44 in the second game cartridge 40. As shown in (a) of FIGS. 10 and 11, the ROM 22 is provided with a plurality of lead terminals. These lead terminals include, for example, address terminals A0 to A15 connected to the 16-bit address bus, data terminals D0 to D7 connected to the 8-bit data bus, control signal terminals (/WR: write bar, /RD: read bar, /CS: chip select bar), and power-supply terminals (VDD), and connected to the connection terminals 46-1 to 46-32. The IC 48 in the second game cartridge 40 carries the ROM 42 and the multiaccess control part 44 in one chip, and also has a plurality of lead terminals. The lead terminals of the IC 48 include, for example, terminals A0/D0 to A15/D15 in charge of lower 16-bit address data of 24-bit address data and 16-bit data (multiplex system), terminals A16 to A23 for upper 8-bit address data of the 24-bit address data, control signal terminals (/WR, /RD, /CS, and /CS2), a power-supply terminal (VDD), and the like. Here, the terminals A0/D0 to A15/D15 are used with the connection terminals (46-6 to 46-21; 6 to 21 are terminal numbers shown in FIG. 12) between first and second timings (multiplex system).

As shown in (b) of FIG. 10, in the second game cartridge 40, the /CS signal is connected to the IC 48 (ROM 42), while the /CS2 signal to the RAM 43. That is, when the /CS signal is outputted, the IC 48 (ROM 42) is activated, and the RAM 43 is activated responding to the /CS2 signal. Here, the /CS and /CS2 signals are outputted to the access control part 362b based on the address data from the second CPU core 362a (will be described later).

By referring to FIG. 12, the cartridge interface of the first and second game cartridges 20 and 40 is now described. Here, FIG. 12 is a table showing the relationship between the first and second game cartridges 20 and 40 in view of applications and functions of the terminals. In FIG. 12, a "NO." column on the left side indicates the terminal number (1 to 32) of the connection terminals 46. A "ROM22" column indicates terminal functions when the ROM 22 in the first game cartridge 20 is the one to be accessed. A "ROM 42" column indicates terminal functions when the ROM 42 in the second game cartridge 40 is the one to be accessed, and a "RAM 43" column indicates terminal functions when the RAM 43 is the one to be accessed. The table shows that the connection terminals 46-1 to 46-29, and 46-32 are used to access both the ROM 22 and RAM 43. Among those connection terminals used to access the ROM 42, the connection terminals 46-6 to 46-29 are used as the address terminals A0 to A23 (i.e., terminals A16 to A23 are upper addresses) with the first timing, and with the second timing, as the data terminals D0 to D15. The connection terminals 46-6 to 46-21 work as the address line with the first timing, and as the data line with the second timing. Thus, some of the connection terminals work as two types of signal lines varying in functions (multiplex system). In the below, the connection terminals 46-6 to 46-21 are denoted as AD0 to AD15 to distinguish from those 46-22 to 46-29 which are used as only the address bus.

Here, with the second game cartridge 40 engaged, the 32-bit circuit 362 is activated in the second game machine 30, wherein the number of bits of a data signal is 32. On the other hand, as described in the foregoing, the terminal for the data signal of the cartridge interface is 16 bits. Thus, the data is to be inputted/outputted twice in unit of 16-bit.

Figure 13:
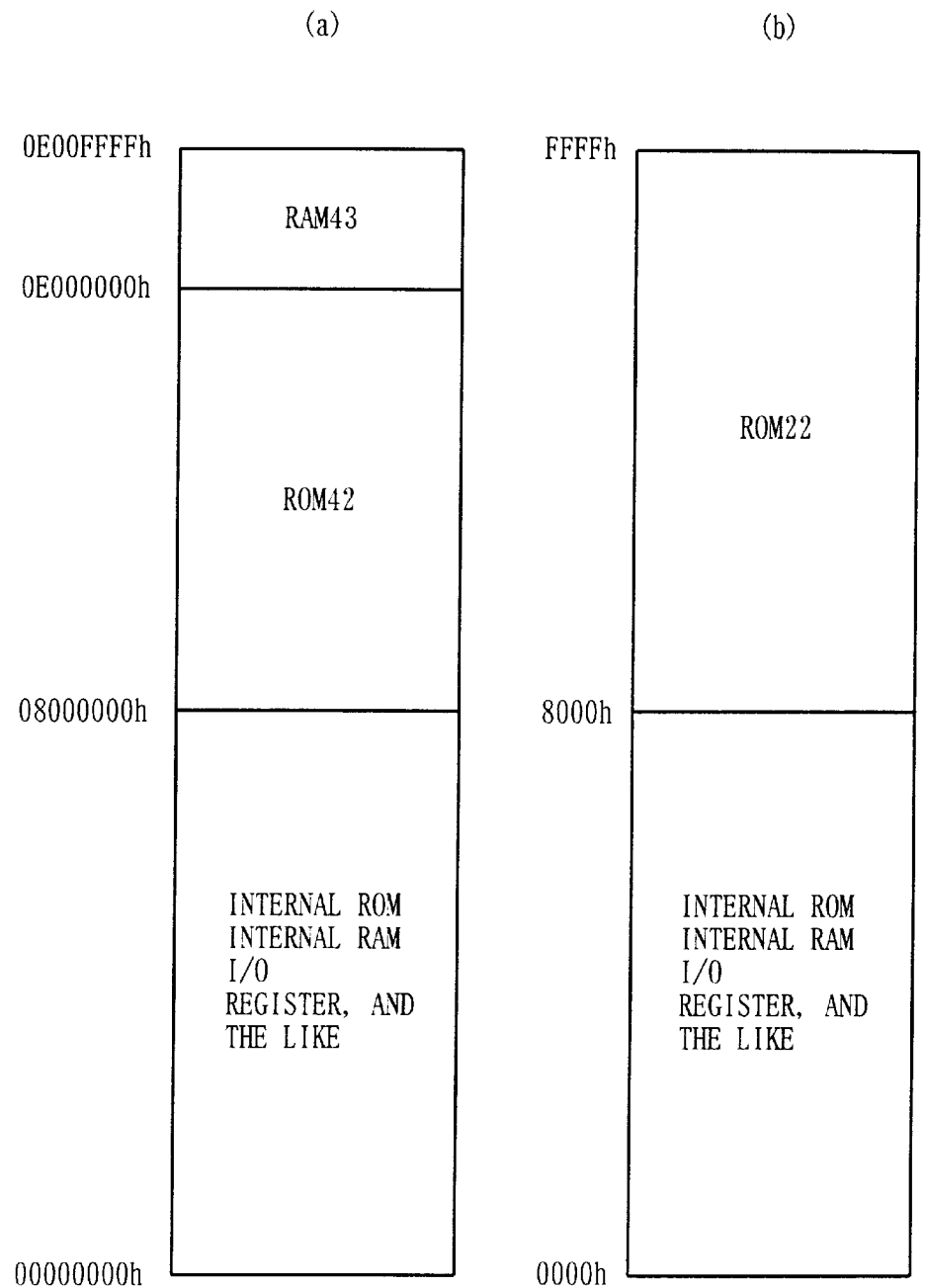
FIG. 13 shows memory maps in the first and second game cartridges shown in FIG. 6.

By referring to FIG. 13, describe next is a memory space in the second game machine 30. Here, FIG. 13(a) is a memory map showing a memory space of the 32-bit circuit 362, while FIG. 13(b) is a memory map showing a memory space of the 8-bit circuit 361. As shown in FIG 13(a), addresses from 00000000h to 08000000h are a memory space assigned for internal ROM, internal RAM, and I/O, a register, and the like, in the 32-bit circuit 362, addresses from 08000000h to 0E000000h is a memory space for the ROM 42, and addresses from 0E000000h to 0E00FFFFh is a memory space for the RAM 43.

When the second game machine 30 accesses the second game cartridge 40, switching processing between the ROM 42 and the RAM 43 is carried out as below. First, if the second CPU core 362a outputs the addresses in the range of 08000000h to 0E000000h, the access control part 362b outputs the /CS signal, and thus the ROM 42 is activated. On the other hand, when the second CPU core 362a outputs the addresses in the range of 0E000000h to 0E00FFFFh, outputted is the /CS2 signal and thus the RAM 43 is activated.

As shown in FIG. 13(b), in the 8-bit circuit 361, addresses from 0000h to 8000h is a memory space reserved for internal ROM, internal ROM, internal RAM, an I/O, a register, and the like, in the 8-bit circuit 361, and addresses from 800h to FFFFh is a memory space for the ROM 22.

Figure 14:
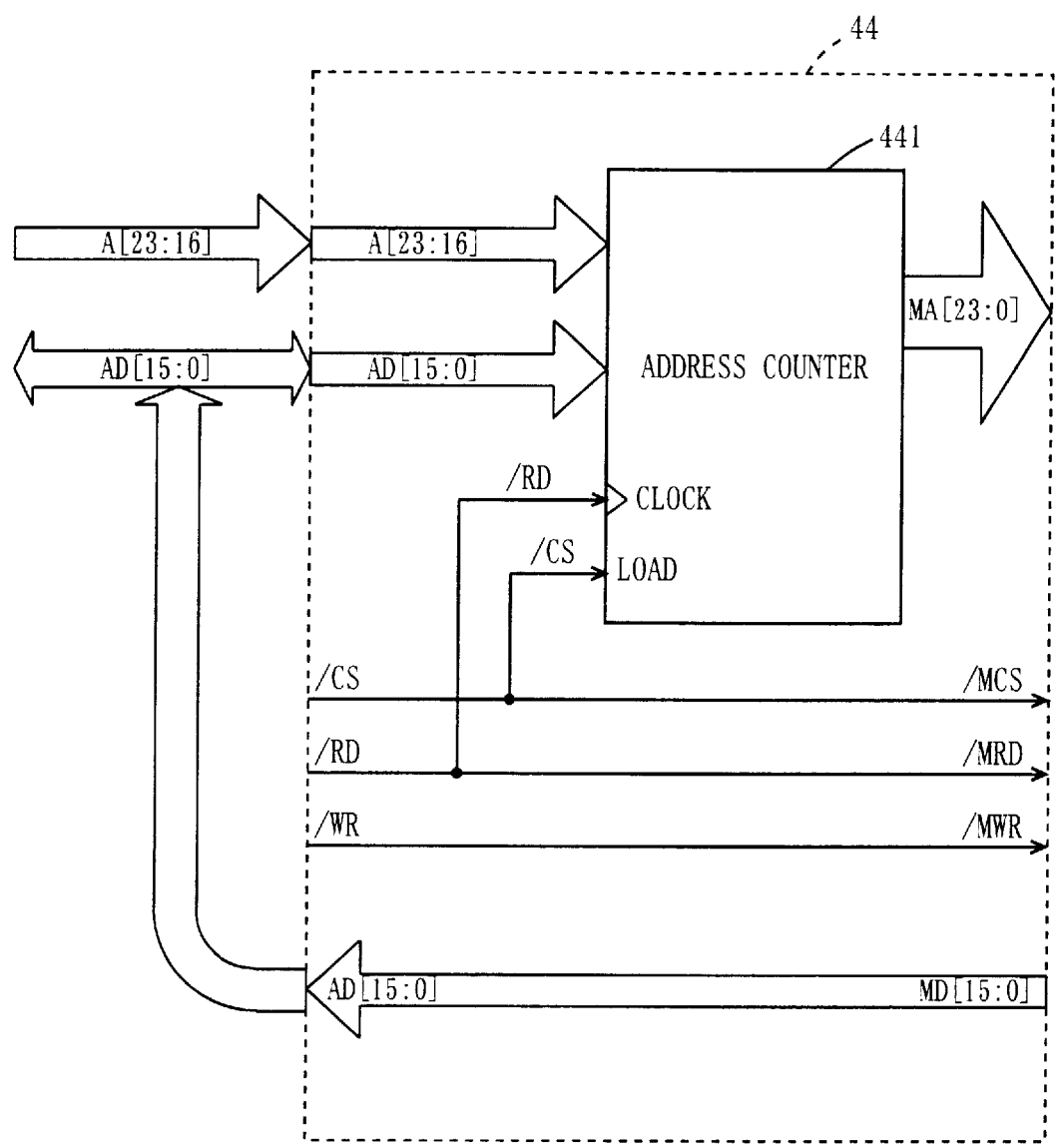
FIG. 14 is a block diagram showing the structure of a multiplex conversion circuit.

Next, by referring to FIG. 14, described is multiplex conversion utilizing an address counter which enables the sequential access. FIG. 14 is a block diagram showing the structure of the multiaccess control part 44 in the second game cartridge 40 for realizing access under the above described multiplex system. In FIG. 14, the multiaccess control part 44 is structured by a multiplex conversion circuit including the address counter 441 so that the sequential access and random access are appropriately switched. This address counter 441 is a 24-bit counter, and capable of retaining and incrementing the address data. As to input/output terminals of the multiaccess control part 44, A[23:16] to be inputted into the address counter 441 means the upper address A23 to A16, and AD[15:0] means either the lower address A15 to A0 or the data bus D15 to D0 depending on the timing. Further, to a LOAD terminal of the address counter 441, the /CS signal (chip select bar; "/" denotes as being low active) is inputted, and to a CLOCK terminal, the /RD signal (read bar) is inputted. Based on these four inputs, the address counter 441 outputs a memory address bus MA [23:0] signal for accessing the ROM 42. Also, a data bus MD [15:0] connected to the bus line of the ROM 42 is connected to AD [15:0] of the terminals 46-6 to 46-21, and then the data D15 to D0 is outputted.

Figure 15:
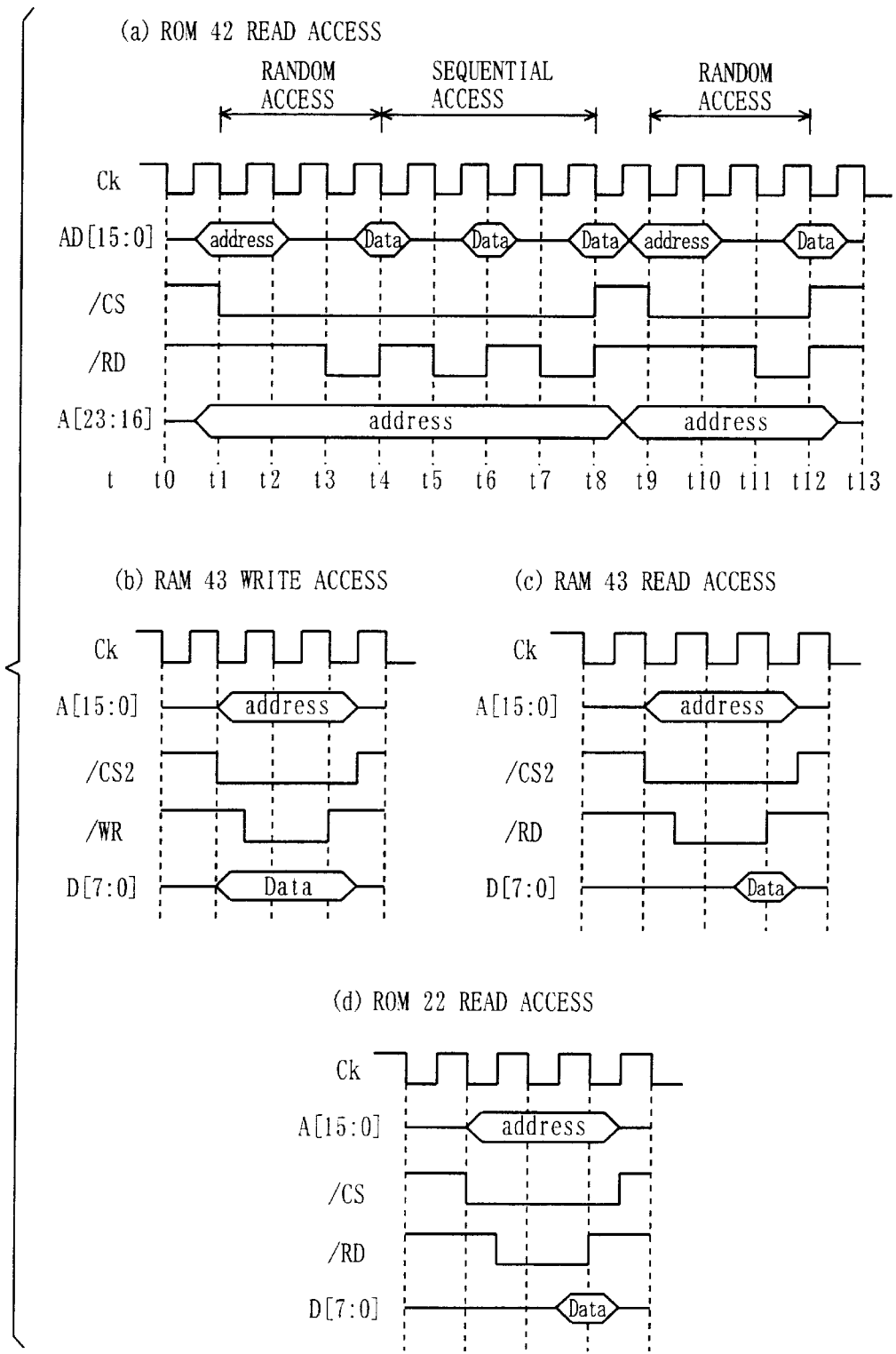
FIG. 15 shows time charts in assistance of explaining read/write access operation in the ROM and RAM of the first and second game cartridges shown in FIG. 6.

By referring to FIG. 15, described next is read/write access of the ROM 42, RAM 43, and ROM 22. FIG. 15 shows timing charts for the read/write access of the second game machine 30 to the memory (ROM 22) of the first game cartridge 20 and the memory (ROM 42 and RAM 43) of the second game cartridge 40. Specifically, FIG. 15(a) shows the read access to the ROM 42, FIG. 15(b) the write access to the RAM 43, FIG. 15(c) the read access to the RAM 43, and FIG. 15(d) the read access to the ROM 22. As to the time chart for the read access of the first game machine 10 to the ROM 22, refer to FIG. 15(d).

In FIG. 15(a), from top to bottom, Ck indicates a waveform of a system clock, AD[15:0] indicates the multiplex transfer operation of address and data in address A0/data D0 to A15/D15 in the terminal number of 6 to 21 shown in FIG. 12, /RD indicates the operation of the read bar in the terminal number of 5 also shown in FIG. 12, A[23:16] indicates an address output of address A16 to A23 in the terminal number of 22 to 29 shown in FIG. 12, and t0 to t13 at the bottom each indicate a time synchronizing with a falling edge of the system clock Ck.

In order to read data from the ROM 42, the random access and sequential access can be switched as appropriate. In detail, in response to the address data outputted from the second CPU core 362a, the multiplex bus controller 362c in the second game machine 30 outputs the /CS signal with the first timing (e.g., times t1 and t9), and also the address data to both the buses A[23:16] and AD[15:0]. At the falling edge of the /CS signal, the address counter 441 loads (or latches) the upper address data provided by the bus A[23:16] and the lower address data provided by the bus AD[15:0]. A count value is then outputted to the ROM 42 as the reading address data A0 to A23 (MA[23:0]). Thereafter, the multiplex bus controller 362c outputs the /RD signal with the second timing (e.g., time t3). At the falling edge of the /RD signal, the multiaccess control part 44 outputs the data D0 to D15 (MD[15:0]) read from the ROM42 to the terminals 46-6 to 46-21. Thus outputted data D0 to D15 is forwarded to the 32-bit circuit 362 via the I/O buffer controller 363 of the second game machine 30.

In the address counter 441, every time the /RD signal comes into the CLOCK terminal, the count value is incremented. In this manner, the sequential access control can be realized.

As such, the ROM 42 is subjected to random access control during times t1 to t4, to sequential access control during times t5 to t8, and to random access control again during times t9 to t12. That means, during times t1 to t8, the /CS signal is set to low. In the meantime, the /RD signal is intermittently set to low during times t3 to t4, times t5 to t6, and times t7 to t8. Under such condition, a reading address is first outputted to AD[0:15] from before time t1 to after time t2, and then data is sequentially accessed before time t4 to before time t9 so that the data is sequentially read over three blocks. After before time t9, the random-access control is made.

Here, the sequential access is applied when addresses are sequentially read for contents of memory. Thus, when the addresses are sequential, the CPU has no need to output any address, and accordingly memory address can be counted up only by using a control signal (/RD). That is, data can be read faster by the time supposedly taken for outputting addresses. Alternatively, program data may be sequentially read in advance so as to smoothly activate the program.

The random access is applied when addresses are non-sequentially read for contents of memory. Therewith, there needs to input an address every time memory is read, and thus reading data takes time.

As such, in the IC 48, the reason why the random access control and the sequential control are both applied (multiplex system) is as follows. In detail, a multiplexed bus has an advantage in less number of terminals (pins) for an interface bus, and some connection terminals are used as a common bus for both the address and data. Therefore, data output cannot be done without address input, and consequently access speed takes longer than the normal bus. This problem can be tackled if the above-described sequential access control is applied. To carry out the sequential access control, however, there needs to provide memory side with a special circuit (address counter) corresponding to the sequential access.

On the other hand, writing/reading to/from the RAM 43, or reading from the ROM 22 can be realized by the random access. Time charts for the operation as such as shown in FIGS. 15(b) to (d). In such case, data access is made separately through the address bus and the data bus, and thus the normal access system is applied instead of the multiplex system.

Figure 16:
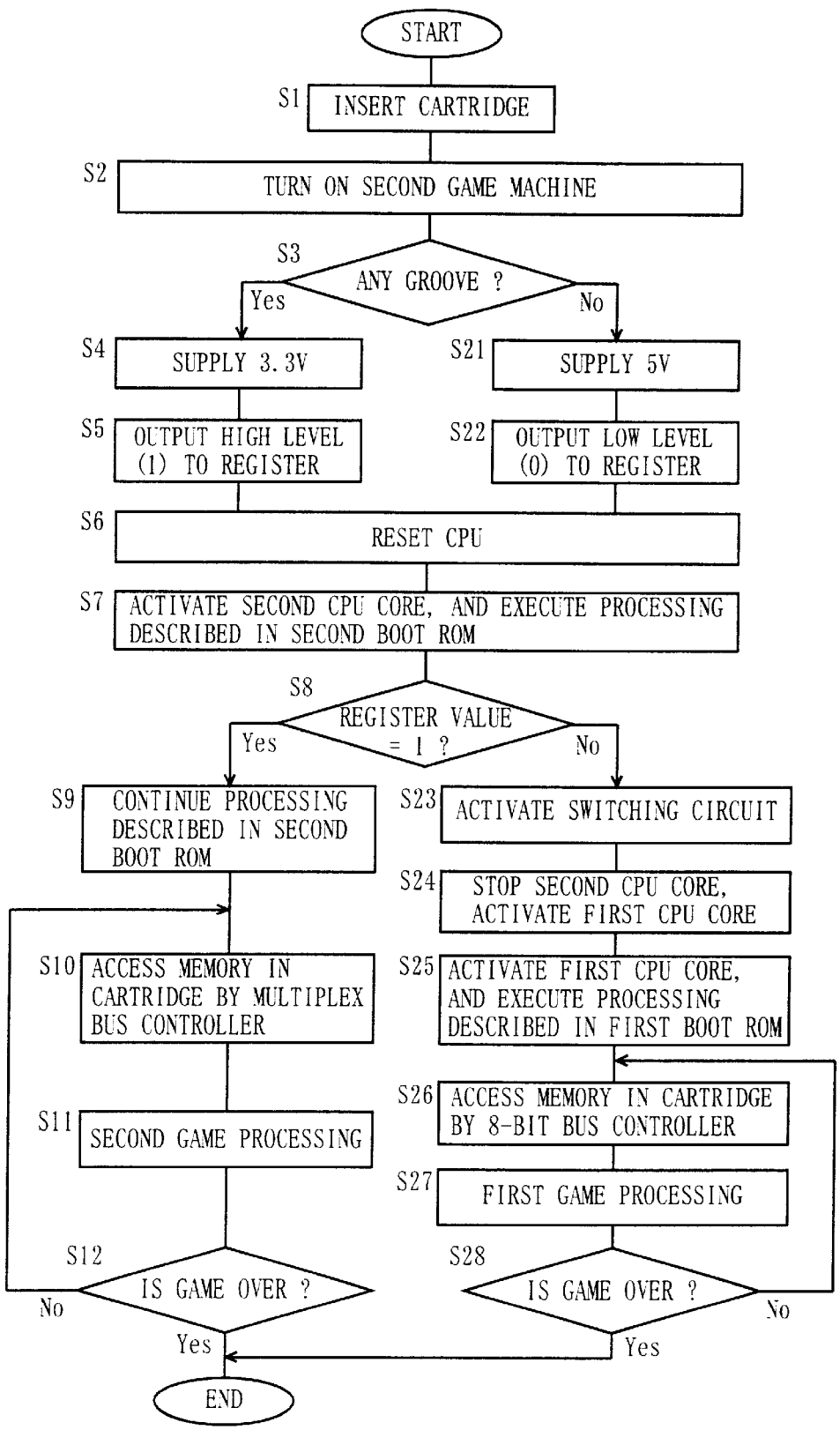
FIG. 16 is a flowchart showing the operation of the information processing device of FIG. 6.

With reference to FIG. 16, described next is the operation of the present game system (especially, the second game machine 30). FIG. 16 is a flowchart showing the specific operation of the game system. To play the game, first of all, the user inserts either the first or the second game cartridge 20 or 40 into the concave part 34 of the second game machine 30 for connection with the connector 37 (step S1). Then, in step S2, the user turns on the power-supply switch 382, and then the following processing is carried out.

In step S3, the detection switch 35 identifies, based on the state of the selector 35s, whether the inserted cartridge is the first or the second game cartridge 20 or 40.

If the inserted cartridge is identified as being the second game cartridge 40, the procedure goes to step S4, and processing for such case is executed. In detail, in step S4, as the selector 35s remains OFF and is connected to the 3.3V output terminal in the DC-DC converter 383, the power-supply voltage of 3.3V is supplied to the second cartridge 40. The procedure then goes to step S5.

In step S5, the register 362f is loaded with a logical value "1" (high level) indicating the second game cartridge 40 is the one currently engaged. Then, the procedure goes to step S6.

In step S6, the reset circuit 385 resets and activates the CPU 360. Then, the procedure goes to step S7.

In step S7, the 32-bit circuit 362 in the second game machine 30 is activated, and in response, the second CPU core 362a carries out an activation program stored in the second boot ROM 362e. The procedure then goes to step S8.

In step S8, the second CPU core 362a determines whether the value stored in the register 362f is "1" or not. If Yes, the procedure goes to step S9.

In step S9, the processing based on the program in the second boot ROM 362e is continuously executed. Then, the procedure goes to step S10.

In step S10, the access control part 362b starts its operation, and the ROM 42 in the second game cartridge 40 is controlled for reading (the RAM 43 is controlled for reading/writing, if required). Here, as described above, the ROM 42 is controlled under the multiplex system. In other words, with one access, the address data A0 to A15 (lower address) and A16 to A24 (upper address) are generated with the first timing, and forwarded to the ROM 42 via the terminals 46-6 to 46-29. And with the second timing, the data D0 to D15 is read through the terminals 46-6 to 46-21. In this manner, the terminals 46-6 to 46-21 are used with both timings. Such bus switching is performed by the multiaccess control part 44. Here, in case of the RAM 43 controlled for writing/reading, the terminals are not used with both timings, and thus the normal access control is applied instead of the multiplex system. Then, the procedure goes to step S11.

In step S11, the second CPU core 362a executes the game program for the second game machine 30 read from the ROM 42, and then generates a game image for display on the liquid crystal display 32. Also, the sound effects of the game are outputted to the speaker 392. The procedure then goes to step S12.

In step S12, it is determined whether the game is over. If determined not yet, the procedure returns to step S10, and repeats steps S10 and S11 until the game is through.

On the other hand, when the cartridge inserted into the second game machine 30 is the first game cartridge 20, the detection switch 35 determines that the cartridge has no groove 412 in step S3. The procedure then goes to step S21.

In step S21, the processing for the first game cartridge 20 is carried out. To be specific, as the selector 35s is ON and is connected to the 5V output terminal in the DC-DC converter 383, the power-supply voltage of 5V is provided to the first game cartridge 20. Then, the procedure goes to step S22.

In step S22, the register 362f is loaded with a logical value "0" (low level) indicating the first game cartridge 20 is the one currently engaged. Then, the procedure goes to steps S6 S7, and S8, and then to step S23.

In step S23, the switching circuit 369 is started up, and then 32-bit circuit 362 is switched to the 8-bit circuit 361. Then, the procedure goes to step S24.

In step S24, the second CPU core 362a is stopped, and the first CPU core 361a is activated. The procedure goes to step S25.

In step S25, the first CPU core 361a executes an activation program stored in the first boot ROM 361c. The procedure goes to step S26.

In step S26, the 8-bit bus controller 361b controls the ROM 22 in the first game cartridge 20 for reading. In this case, generated is the address data for processing of the first CPU core 361a with such timing as shown in (d) of FIG. 15. The procedure then goes to step S27.

In step S27, based on the game program for an 8-bit game machine read from the ROM 22 in the first game cartridge 20, the game processing for the first game machine is executed. The procedure goes to step S28.

In step S28, it is then determined whether the game is now over. If determined not yet, the procedure returns to step S26, and repeats steps S26 and S27 until the game is through.

Hereinafter, by referring to FIGS. 17, 18, 19, and 20, some examples of the cartridge discrimination means other than the above are described.

Figure 17:
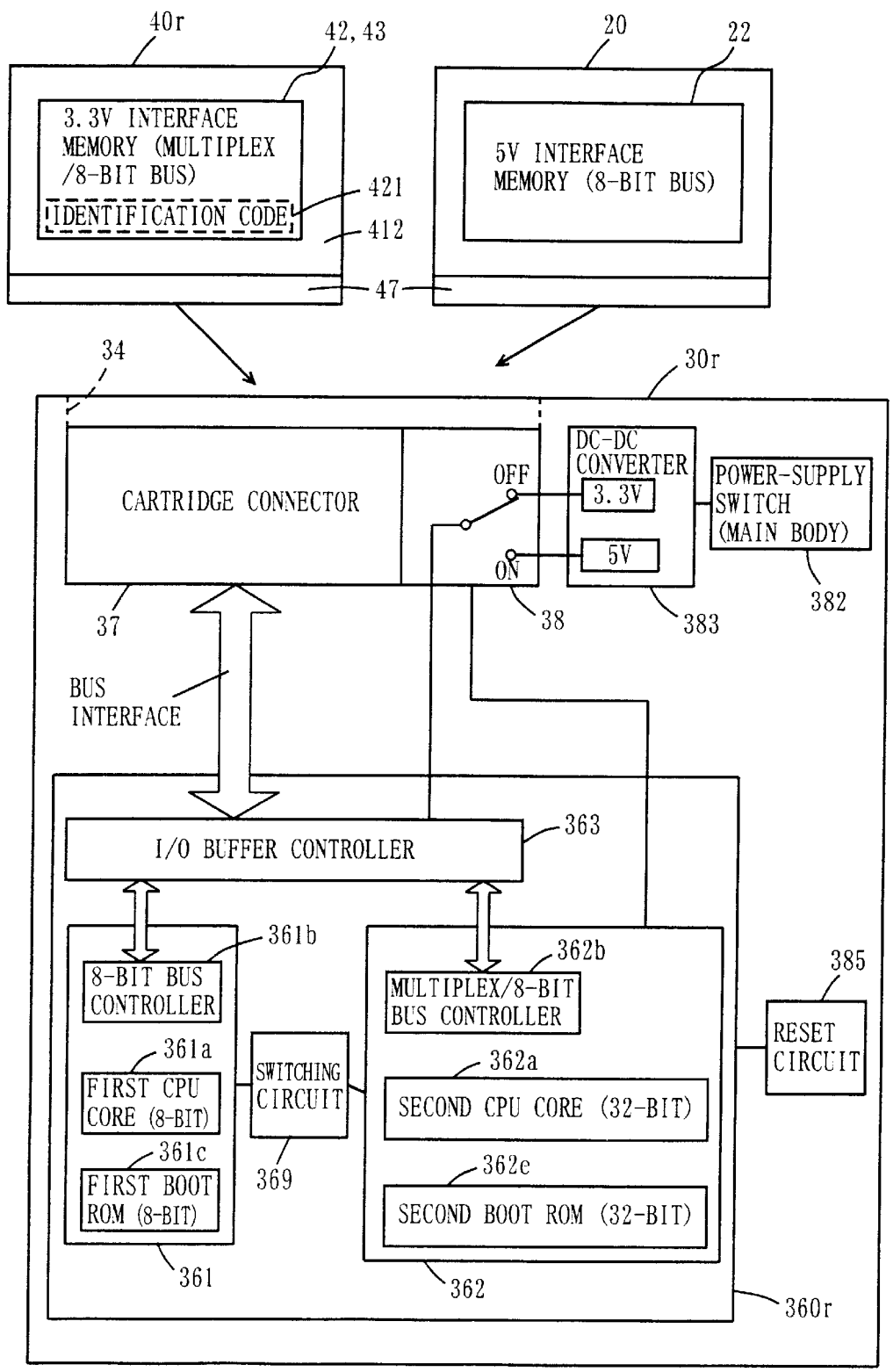
FIG. 17 is a block diagram showing main parts relevant to cartridge discrimination processing, unlike the example shown in FIG. 7, based on an identification code.
Figure 18:
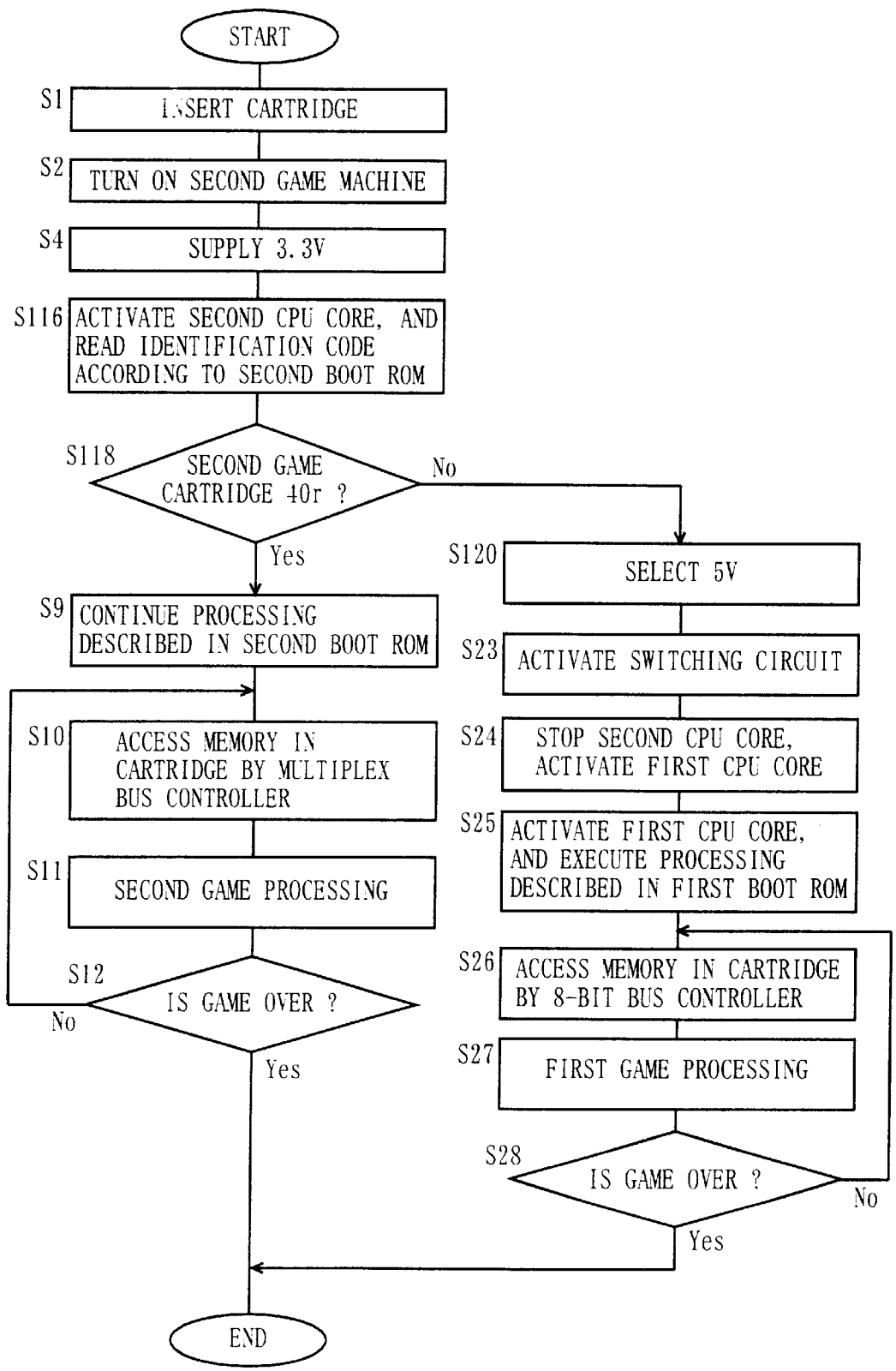
FIG. 18 is a flowchart showing a cartridge identification method in the information processing device of FIG. 17.

By referring to FIGS. 17 and 18, described first is an example of discriminating the cartridge between the second game cartridge 40 and the first game cartridge 20 by storing an identification code each corresponding to the cartridge type in a storage device provided in the cartridge, so that the identification code is read when power is turned on.

FIG. 17 is, as is FIG. 7, a block diagram showing main parts relevant to the above processing of discriminating the cartridge between the first and second game cartridges 20 and 40. A second game machine 30r in this example is, compared with the second game machine 30 of FIG. 7, provided with a voltage selector 38 instead of the detection switch 35. Also the second game cartridge 40 is replaced with a second game cartridge 40r therein. Further, the voltage detector 384 and the register 362f provided in the second game machine 30 are not provided. The voltage selector 38 is connected to the 32-bit circuit 362, and is controlled by a control signal outputted therefrom.

In the second game cartridge 40r, instead of the groove 412, the identification code representing its type is stored in an identification code region 421 provided in the 3.3V interface memories 42 and 43. As is the detection switch 35, the voltage selector 38 is a switch for selecting an output from the DC-DC converter 383, but operates not mechanically but electronically. With such structure change, in this example, the voltage detector 384 and the register 362f shown in FIG. 7 are not necessary any more. Thus, for the purpose of discriminating from the CPU 360 and the second game machine 30 of FIG. 7, such differently-structured CPU and the information processing device are referred to as CPU 360r and second game machine 30r, respectively.

Described next is the operation for cartridge discrimination utilizing the identification code in the above-described second game machine 30r. When the second game machine 30r is turned on, the voltage of 3.3V goes to the first or second game cartridge 20 or 40. Then, the second CPU core 362a is activated.

The second CPU core 362a works to read the identification code stored in a specific region in memories provided in the first and second game cartridges 20 and 40. If successfully read and if the read identification code indicates the second game cartridge 40r, the second CPU core 362a keeps working.

If the read identification code does not indicate the second game cartridge 40r, or if failed to read the identification code, the second CPU core 362a identifies the cartridge as being the first game cartridge 20. In this case, the 32-bit circuit 326 let the voltage selector 38 select 5V. The second CPU core 362a then starts the switching circuit 369.

The switching circuit 369 stops the second CPU core 362a, and starts the first CPU core 361a.

Next, by referring to a flowchart shown in FIG. 18, the operation of the second game machine 30r in this example is described. In this flowchart, compared with the flowchart shown in FIG. 16, steps S3, S5, S6, S21, and S22 are not included, step S116 is included instead of step S7, step S118 is included instead of step S8, and step S120 is additionally included between steps S118 and S23.

Hereinafter, the operation of the second game machine 30r is described focusing on the steps unique to this example. First, in step S1, the first game cartridge 20 or the second game cartridge 40 is inserted into the concave part 34 in the second game machine 30r. Then, a user turns on the power-supply switch 382 in the second game machine 30r.

In step S4, the DC-DC converter 383 supplies, via the voltage selector 38, DC of 3.3V to the cartridge. The procedure then goes to step S116.

In step S116, the second CPU core 362a in the CPU 360r is activated, starts executing the processing described in the second boot ROM 362e, and then reads the identification code stored in the identification code region in the inserted cartridge.

Specifically, when the connector 37 is engaged with the second game cartridge 40r, the identification code is read from the identification code region 421.

On the other hand, when the connector 37 is engaged with the first game cartridge 20, as already described, the identification code indicating the second game cartridge 40r is not read. Then, the procedure goes to step S118.

In step S118, based on the identification code read in step S116, the type of cartridge engaged with the connector 37 is determined. In this example, the cartridge being engaged is determined whether the second game cartridge 40r or not.

Yes, that is, if determined as being the second game cartridge 40r, the procedure goes to steps S9 to S12, which are described in the foregoing.

No, that is, if determined as not being the second game cartridge 40r but the first game cartridge 20, the procedure goes to step S120.

In step S120, the voltage selector 38 selects 5V instead of 3.3V. Then, the procedure goes to steps S23 to S28, which are described in the foregoing.

Here, the processing in steps S116 and S118 is described more in detail. In the case that the second game cartridge 40r is engaged, the processing is carried out as already described. When the first game cartridge 20 is engaged, however, normal access cannot be achieved with respect thereto in step S116. This is because the voltage supplied thereto in step S4 is 3.3V. Even if successfully accessed, the first game cartridge 20 has no identification code region 421. As a result, in step S116, the identification code indicating the first game cartridge 20 is not read out, and thus it is determined as having the first game cartridge 20 engaged, that is, determined as No.

Here, the second game cartridge 40r and the first game cartridge 20 may be driven by the same level of voltage (e.g., 3.3V), and are each provided with memory which is accessible by common bus control (e.g., separate bus control) so as to store the identification code only. If so, the second CPU core 362a becomes accessible to the memory regardless of the cartridge type, and can correctly read the identification code from the identification code region 421 or an identification code region for the first game cartridge 20.

Figure 19:
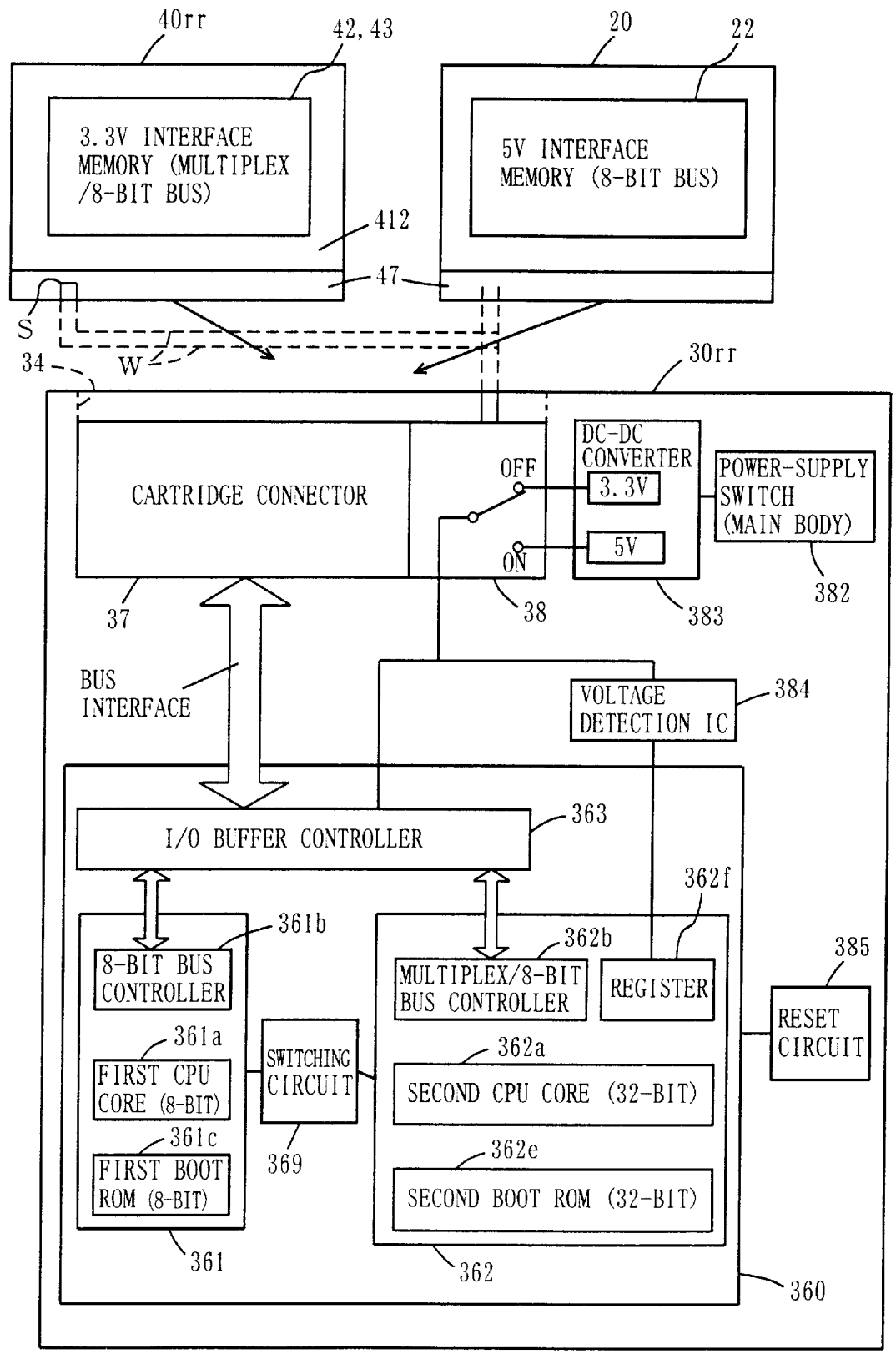
FIG. 19 is a block diagram showing main parts relevant to another cartridge discrimination processing, unlike the examples shown in FIGS. 7 and 17, in case of a short being observed.
Figure 20:
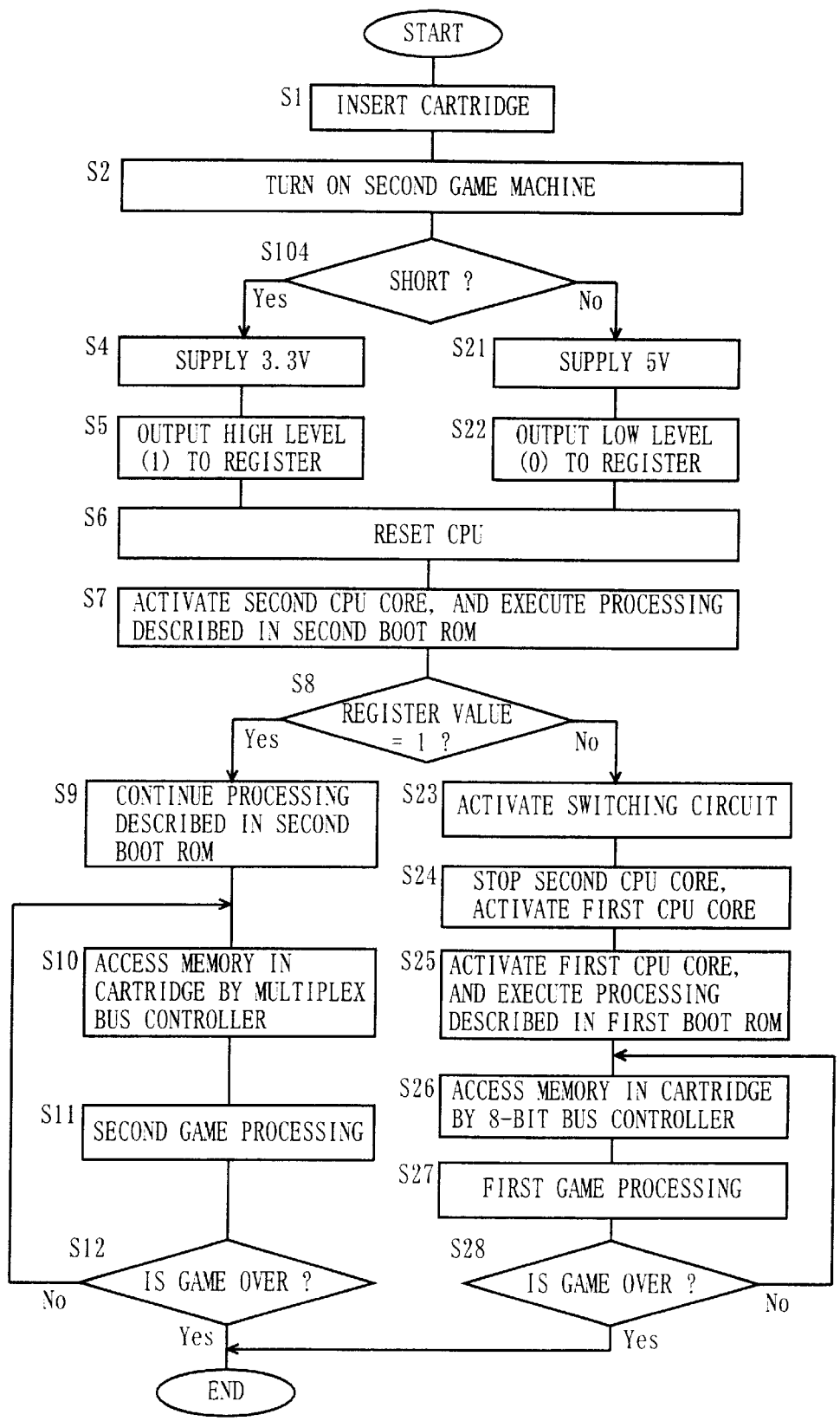
FIG. 20 is a flowchart showing a cartridge discrimination method in the information processing device of FIG. 19.

Next, by referring to FIGS. 19 and 20, a method is described for identifying the type of cartridge utilizing a signal-line short. FIG. 19 is, as is FIG. 17, a block diagram showing main parts relevant to processing of discriminating between the first and second cartridges 20 and 40.

A second game machine 30rr in this example is, compared with the second game machine 30 shown in FIG. 7, provided with the voltage selector 38 instead of the detection switch 35. Also the second game cartridge 40 is replaced with a second game cartridge 40rr therein. Further, the concave part 34 therein is additionally provided with two signal lines W extending from the voltage selector 38. The second game cartridge 40rr is provided with a short S which causes those two signal lines W to short out when the second game cartridge 40rr is inserted into the concave part 34.

In such structured second game machine 30rr, the signal lines W are not shortened when the first game cartridge 20 is the one inserted into the concave part 34. However, when the second game cartridge 40rr is inserted into the concave part 34, those two signal lines W are shortened by the short S. Such short observed for those two signal lines W helps the second game machine 30rr identify the cartridge type through detection. Here, based on such short observed for those signal lines W, the voltage selector 38 selects either 3.3V or 5V.

The operation of the second game machine 30rr for identifying the cartridge type based on the short observed for the two signal lines W is similar to that for the second game machine 30r for identifying the cartridge utilizing the identification code. Note that, in the second game machine 30rr, the second CPU core 362a detects the short observed for the signal lines instead of reading the identification code. Since detected herein is only the short, it is possible to correctly detect the short even when the voltage supplied is 3.3V responding to the first game cartridge 20 engaged.

Next, by referring to the flowchart shown in FIG. 20, the operation of the second game machine 30rr is described. Compared with the flowchart shown in FIG. 16, this flowchart does not have step S3, but is additionally provided with step S104 between step S2 and step S4 or step S21.

Hereinafter, the operation of the second game machine 30rr is described focusing on the steps unique to this example. First, in step S1, the cartridge is inserted into the concave part 34 in the second game machine 30rr. In step S2, a user turns on the power-supply switch 382 in the second game machine 30rr.

In step S104, it is determined whether the signal lines W are shortened. Yes, that is, if the signal lines W are determined as shortened by the short S provided in the second game cartridge 40rr, the processing in the above-described steps S4 to S12 is executed.

No, that is, if the signal lines W are determined not as shortened since the first game cartridge 20 has no short S, the processing in the above-described steps S21 to S28 is executed.

As described in the foregoing, in the present invention, the first game cartridge 20 for the first game machine 10 being a low-end machine is usable also for the second game machine 30 being a high-end machine. Thus, compatibility among the game cartridges (game soft) can be ensured. Further, depending on the cartridge type currently engaged to a game machine, voltage switch is automatically done and thus access control can be achieved.

Further, in the present invention, even if the level of the voltage supplied to a cartridge and an access manner thereto vary depending on the memory type therein, the memory in the cartridge is accessible by identifying the cartridge, and according to the result obtained thereby, by switching the voltage level and an operation mode of central processing means.

When an information processing device or a game device, for example, is provided with a professor in which the number of bits for data processing is rather large, data width of a connector may not be wide enough. In the present invention, however, memory which has the number of data bits corresponding to the number of bits in the processor for data processing can be connected to a common bus. Further, when the information processing device or game device, for example, is provided with processors each having the different number of bits for data processing to retain compatibility of software, for example, memories each corresponding to those processors are connected to the common bus to be accessed.

Still further, in the present invention, a multiplex bus transfer mode technology is applied to deal with not only two types of memories differed in number of bits of an address signal but those differed in the number of bits of a data signal. Also, the present invention can provide memory which is stored in a cartridge having a function used for cartridge discrimination between the one for the second game machine 30 and the one for the information processing system CGB.

While the invention has been described in detail, the foregoing description is in all aspects illustrative and not restrictive. It is understood that numerous other modifications and variations can be devised without departing from the scope of the invention.

What is claimed is:

1. An information processing device comprising an external bus having a first data width, and via the external bus, being engaged with, in a detachable manner, either a first cartridge which houses first memory having the first data width or a second cartridge which houses second memory having a second data width different from the first data width, and executing processing based on data stored in the memory of whichever cartridge is selectively engaged, wherein, said second cartridge is provided with marker means to be distinguished from said first cartridge, said information processing device comprising:

cartridge discrimination means for discriminating, based on said marker means, between said first cartridge and said second cartridge;

central processing means for accessing the memory of the engaged cartridge;

first access control means for controlling said external bus under a normal bus control method, and having said central processing unit access said first memory;

second access control means for controlling said external bus under a bus control method different from the bus control method for said first access control means, and having said central processing means access said second memory; and selection means for selecting said first access control means when said cartridge discrimination means determines the engaged cartridge as being said first cartridge, and selecting said second access control means when the engaged cartridge is determined as being said second cartridge.

2. The information processing device as described in claim 1, wherein said second data width is wider than said first data width, and said second access control means exchanges address and data between said central processing means and said second memory by using said external bus in a time-sharing manner.

3. The information processing device as described in claim 2, wherein said second access control means controls, in the time-sharing manner, said external bus to be used with a first timing for an address signal and with a second timing for a data signal.

4. The information processing device as described in claim 1, wherein said marker means comprises a shape difference between said first cartridge and said second cartridge, and said cartridge discrimination means abuts the engaged cartridge, and based on said shape difference, identifies the engaged cartridge as being said first or second cartridge.

5. The information processing device as described in claim 2, wherein said second cartridge further houses third memory having said first data width, the information processing device further comprises determination means to determine, when said cartridge discrimination means identifies the engaged cartridge as being said second cartridge, which of said second memory and said third memory is to be accessed by said central processing means, and said second access control means controls said external bus in the time-sharing manner when said determination means determines said central processing means is to access said second memory, and controls said external bus under the normal bus control method when said determination means determines said central processing means is to access said third memory.

6. The information processing device as described in claim 5, wherein an address space for said central processing means to access said second memory is allocated to a first address space, and an address space for said central processing means to access said third memory is allocated to a second address space, and said determination means determines, when said first address space is designated, said second memory as being accessed, and when said second address space is designated, said third memory as being accessed.

7. The information processing device as described in claim 1, wherein said central processing means comprises:

a first operation function operating in said first data width; and a second operation function operating in said second data width, and said selection means selects said first operation function when said cartridge discrimination means determines the engaged cartridge as being said first cartridge, and selects said second operation function when the engaged cartridge is determined as being said second cartridge.

8. The information processing device as described in claim 1, wherein said second cartridge comprises:
   address retention means for retaining an address value outputted from said central processing means; and
   increment means for incrementing the value retained by said address retention means in response to a control signal outputted from said central processing means, and
   by designating the value retained in said address retention means as an address value, sequential access is carried out.

9. The information processing device as described in claim 1, wherein
   said marker means comprises memory housed in said second cartridge for storing an identification code indicating a cartridge type, and
   said cartridge discrimination means reads out said identification code, and based on said identification code, identifies the engaged cartridge as being said first or second cartridge.

10. The information processing device as described in claim 1, wherein
    said marker means comprises two signal lines being either shorted or not-shorted, and
    said cartridge discrimination means detects whether said two signal lines are shorted or not-shorted, and based thereon, identifies the engaged cartridge as being said first or second cartridge.

11. A storage device being placed inside of a first cartridge engaged with an information processing device in a detachable manner, and storing data executed or utilized by the information processing device, wherein,
    said information processing device comprises a connector being engageable with, in a detachable manner, either said first cartridge whose bus has a first data width or a second cartridge whose bus has a second data width narrower than the first data width, and having the same data width as said second data width; and central processing means which accesses, when connected with said first or second cartridge via the connector, the first cartridge in a multiplex bus transfer mode, and the second cartridge in a normal bus transfer mode, said storage device comprising:
    general-purpose memory having said first data width for storing data to cause said central processing means to execute processing; and
    multiplex bus conversion means for controlling, in a time-sharing manner, address and data exchange between said central processing means and said general-purpose memory.

12. The storage device as described in claim 11, wherein said multiplex bus conversion means comprises:
    address retention means for retaining an address value outputted from said central processing means;
    increment means for incrementing the value retained in said address retention means in response to a control signal outputted from said central processing means, and
    the value retained in said address retention means is outputted to said general-purpose memory, and said central processing means is caused to carry out sequential access with respect to the general-purpose memory.

13. The storage device as described in claim 11, wherein said general-purpose memory and said multiplex bus conversion means are structured on one chip.

14. The storage device as described in claim 11, wherein the data width of said general-purpose memory is wider than memory housed in said second cartridge.

15. A cartridge engaged with an information processing device, in a detachable manner, via a connector having a first data width, the cartridge comprising:
    memory for storing data to cause said information processing device to execute processing, and having a second data width wider than said first data width;
    marker means for designating a method for accessing said memory as a multiplex method; and
    multiplex bus conversion means for controlling, in a time-sharing manner, address and data exchange between said information processing device and said memory.

16. The cartridge as described in claim 15, wherein said marker means comprises a shape of a cartridge.

17. The cartridge as described in claim 15, wherein,
    in said information processing device, said connector is selectively engaged in a detachable manner with another cartridge which houses memory having said first data width.

18. The cartridge as described in claim 15, wherein
    said information processing device can select between a normal bus transfer mode and a multiplex bus transfer mode when accessing to the memory housed in the cartridge, and
    said marker means is used to let said information processing device select the multiplex bus transfer mode.

19. The cartridge as described in claim 17, wherein
    said information processing device includes a first operation function in said first data width, and a second operation function in said second data width, and
    said marker means is used to let said information processing device operate said second operation function.

20. The cartridge as described in claim 15, wherein said marker means stores an identification code indicating a cartridge type, and comprises memory housed in said second cartridge.

21. The cartridge as described in claim 15, wherein said marker means comprises two signal lines being either shorted or not-shorted.

22. A game system, comprising:
    a first game machine including a first central processing unit with low throughput;
    a first cartridge engageable with the first game machine in a detachable manner;
    a second game machine higher in performance than the first game machine and which is compatible with said first game machine; and
    a second cartridge engageable with the second game machine, wherein said first cartridge comprises:
    a first housing, said first housing accommodating
    a first semiconductor information storage element fixedly storing game program data, and being accessible using a first data width, and
    a first circuit board, in a desired circuit pattern, having a plurality of terminals formed on one side thereof, and the first semiconductor information storage element being mounted thereon,
    said second cartridge comprises:
    a second housing having a to-be-detected part for distinction from the first cartridge;
    a second semiconductor information storage element for fixedly storing game program data, and being accessible using a second data width wider than said first data width;
a second circuit board, in a desired circuit pattern, having the same number of terminals in the same alignment formed on one side thereof as said first circuit board; and
multiaccess control means for reading the game program data stored in said second semiconductor information storage element in the multiplex system, said second housing accommodating said second semiconductor information storage element and the multiaccess control means both mounted on said second circuit board, and
said second game machine comprises:
a connector for establishing electrical connection with said second cartridge having the same number of terminals in the same alignment as another connector provided in said first game machine so that said first cartridge becomes engageable;
a second central processing unit with higher throughput compared with said first central processing unit;
a third central processing unit having about the same throughput as said first central processing unit;
first access control means for accessing said first cartridge;
second access control means for accessing said second cartridge in a multiplex system; and
detection means for detecting said to-be-detected part provided to said second housing, wherein
when said detection means detects said to-be-detected part, said second central processing unit and said second access control means are activated to access said second cartridge, and said multiaccess control means accesses said second semiconductor information storage element, and
when said detection means does not detect said to-be-detected part, said third central processing unit and said first access control means are activated to access said first cartridge.

23. The game system as described in claim 22, wherein said first semiconductor information storage element outputs data of a first number of data bits, and
said second semiconductor information storage element outputs data of a second number of data bits larger than said first number of data bits.

24. The game system as described in claim 22, wherein said first semiconductor information storage element is accessed by address data of a first number of address bits, and
said second semiconductor information storage element is accessed by address data of a second number of address bits larger than said first number of address bits.

25. The game system as described in claim 22, wherein said second housing is structured to be shorter in height than said first housing, and on one side plane not inserted into said second game machine, a protrusion is so formed as to protrude at least to one lateral direction.

26. The game system as described in claim 22, wherein said multiaccess control means is integrally formed on a chip together with said second semiconductor information storage element, and electrically placed in between said second semiconductor information storage element and a lead terminal connected to the plurality of terminals in the circuit pattern of said circuit board.

27. The game system as described in claim 22, wherein, when accessed by said second central processing unit, said multiaccess control means acquires a desired address of said second semiconductor information storage element with a first timing to access the second semiconductor information storage element and read information therefrom, and with a second timing, supplies data read from the second semiconductor information storage element to said second game machine.

28. The game system as described in claim 22, wherein said second semiconductor information storage element is driven by a second driving voltage different from a first driving voltage for said first semiconductor information storage element, and
after cartridge insertion, said second game machine supplies the first driving voltage to the first cartridge and the second driving voltage to the second cartridge so that the first and the second cartridges both are selectively usable.

29. A game cartridge used as a second cartridge in a game system comprising:
a first game machine low in performance;
a first cartridge engageable with the first game machine in a detachable manner;
a second game machine being higher in performance than the first game machine, and having compatibility with the first game machine; and
said second cartridge engageable with the second game machine in a detachable manner, wherein
said second cartridge comprises:
a housing;
a to-be-detected part formed in said housing for distinction from said first cartridge;
a second semiconductor information storage element housed in said housing for fixedly storing game program data for said second game machine and being accessed by a data width wider than that of a first semiconductor information storage element included in said first cartridge;
multiaccess control means for reading the game program data stored in said second semiconductor information storage element in a multiplex system; and
a circuit board, wherein
said circuit board has the same number of terminals in the same alignment formed on one side thereof as in said first cartridge, and when said second semiconductor information storage element and said multiaccess control means are mounted thereon, a desired circuit pattern is so established as to connect among the terminals, the second semiconductor information storage element, and the multiaccess control means.

30. The game cartridge as described in claim 29, wherein data outputted by said second semiconductor information storage element is larger in number of data bits than data outputted by the first semiconductor information storage element included in said first cartridge.

31. The game cartridge as described in claim 29, wherein the number of address bits accessing said second semiconductor information storage element is larger than the number of address bits accessing said first semiconductor information storage element.

32. The game cartridge as described in claim 29, wherein said housing of said second cartridge is structured to be shorter in height than said first cartridge for said first game machine, and on one side plane not inserted into said second game machine, a protrusion is so formed as to protrude at least to one lateral direction.

33. The game cartridge as described in claim 29, wherein said multiaccess control means is integrally formed on a chip together with said second semiconductor information storage element, and placed in between said second semiconductor information storage element and a terminal part connected to the plurality of terminals in the circuit pattern of said circuit board.

34. The game cartridge as described in claim 29, wherein, when accessed by processing means included in said second game machine, said multiaccess control means designates a desired address of said second semiconductor information storage element by address data of address bits larger in number than address bits of said first semiconductor information storage element, and reads data of the designated address by using address terminals for a lower number of bit address data for supply to said second game machine.

35. The game cartridge as described in claim 29, wherein
said second semiconductor information storage element is driven by a driving voltage different from that for said first semiconductor information storage element, and
said circuit board of said second cartridge includes a power-supply terminal for receiving, from said second game machine, a voltage supply different from that from said first game machine.

36. The game cartridge as described in claim 29, wherein said multiaccess control means comprises address retention means for retaining an address value, and the address retention means is so structured as to acquire an address value on a bus in response to a first signal, and increment data of said address retention means in response to a second signal.

37. A game machine used as a second game machine in a game system comprising:
a first game machine including a first central processing unit with low throughput;
a first cartridge engageable with the first game machine in a detachable manner;
the second game machine higher in performance than the first game machine and which is compatible with the first game machine; and
a second cartridge engageable with the second game machine, wherein said first cartridge comprises
a first housing, said first housing accommodating
a first semiconductor information storage element fixedly storing game program data, and being accessible using a first data width, and
a first circuit board, in a desired circuit pattern, having a plurality of terminals formed on one side thereof, and the first semiconductor information storage element being mounted thereon,
said second cartridge comprises:
a second housing having a to-be-detected part for distinction from the first cartridge;
a second semiconductor information storage element for fixedly storing game program data, and being accessible using a second data width wider than said first data width;
a second circuit board, in a desired circuit pattern, having the same number of terminals in the same alignment formed on one side thereof as said first circuit board; and
multiaccess control means for reading the game program data stored in said second semiconductor information storage element in the multiplex system, said second housing accommodating
said second semiconductor information storage element and the multiaccess control means both mounted on said second circuit board, and
said game machine comprises:
a connector for establishing electrical connection with said second cartridge having the same number of terminals in the same alignment as another connector provided in said first game machine so that said first cartridge becomes engageable;
a second central processing unit with higher throughput compared with said first central processing unit;
a third central processing unit having about the same throughput as said first central processing unit;
first access control means for accessing said first cartridge;
second access control means for accessing said second cartridge in a multiplex system; and
detection means for detecting said to-be-detected part provided to said second housing, wherein
when said detection means detects said to-be-detected part, said second central processing unit and said second access control means are activated to access said second cartridge, and said multiaccess control means accesses said second semiconductor information storage element, and
when said detection means does not detect said to-be-detected part, said third central processing unit and said first access control means are activated to access said first cartridge.

38. The game machine as described in claim 37, wherein
said first semiconductor information storage element outputs data of a first number of data bits, and
said second semiconductor information storage element outputs data of a second number of data bits larger than said first number of data bits.

39. The game machine as described in claim 37, wherein
said first semiconductor information storage element is accessed by address data of a first number of address bits, and
said second semiconductor information storage element is accessed by address data of a second number of address bits larger than said first number of address bits.

40. The game machine as described in claim 37, wherein
said second semiconductor information storage element is so selected as to be driven by a second driving voltage different from a first driving voltage for said first semiconductor information storage element, and
when said detection means detects said to-be-detected part, the second driving voltage is supplied to the second cartridge, and when said detection means does not detect said to-be-detected part, the first driving voltage is supplied to the first cartridge.

41. An information processing device comprising an external bus having a first data width, and via the external bus, being engaged with, in a detachable manner, either a first cartridge which houses first memory having the first data width or a second cartridge which houses second memory having a second data width different from the first data width, and executing processing based on data stored in the memory of whichever cartridge is selectively engaged, wherein,
said second cartridge is provided with a marker to be distinguished from said first cartridge,
said information processing device comprises:
a cartridge discriminator for discriminating, based on said marker, between said first cartridge and said second cartridge;

a central processing unit for accessing the memory of the engaged cartridge;

a first access controller for controlling said external bus under a normal bus control method, and having said central processing unit access said first memory;

a second access controller for controlling said external bus under a bus control method different from the bus control method for said first access controller, and having said central processing unit access said second memory; and a selector for selecting said first access controller when said cartridge discriminator determines the engaged cartridge as being said first cartridge, and selecting said second access controller when the engaged cartridge is determined as being said second cartridge.

42. A storage device being placed inside of a first cartridge engaged with an information processing device in a detachable manner, and storing data executed or utilized by the information processing device, wherein, said information processing device comprises a connector being engageable with, in a detachable manner, either said first cartridge whose bus has a first data width or a second cartridge whose bus has a second data width narrower than the first data width, and having the same data width as said second data width; and a central processing unit which accesses, when connected with said first or second cartridge via the connector, the first cartridge in a multiplex bus transfer mode, and the second cartridge in a normal bus transfer mode, and said storage device comprises:

memory having said first data width for storing data to cause said central processing means to execute processing; and a multiplex bus converter for controlling, in a time-sharing manner, address and data exchange between said central processing unit and said memory.

* * * * *